(12) United States Patent
Luo et al.

(10) Patent No.: US 12,295,015 B2
(45) Date of Patent: May 6, 2025

(54) INDICATION OF A RESOURCE PATTERN FOR FREQUENCY DIVISION MULTIPLEXING WITHIN A COMPONENT CARRIER FOR A WIRELESS MULTI HOP NETWORK

(71) Applicant: QUALCOMM Incorporated, San Diego, CA (US)

(72) Inventors: Jianghong Luo, Skillman, NJ (US); Navid Abedini, Basking Ridge, NJ (US); Naeem Akl, Somerville, NJ (US); Luca Blessent, Whitehouse Station, NJ (US); Karl Georg Hampel, Jersey City, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 281 days.

(21) Appl. No.: 17/654,378

(22) Filed: Mar. 10, 2022

(65) Prior Publication Data

US 2022/0321284 A1 Oct. 6, 2022

Related U.S. Application Data

(60) Provisional application No. 63/167,970, filed on Mar. 30, 2021.

(51) Int. Cl.
*H04W 72/29* (2023.01)
*H04L 5/00* (2006.01)

(52) U.S. Cl.
CPC ............ *H04W 72/29* (2023.01); *H04L 5/001* (2013.01); *H04L 5/0053* (2013.01)

(58) Field of Classification Search
CPC .............................. H04W 72/20; H04W 72/29
See application file for complete search history.

(56) References Cited

U.S. PATENT DOCUMENTS

2022/0217661 A1* 7/2022 Yokomakura .......... H04B 7/155
2023/0134743 A1* 5/2023 Åström ................ H04L 5/0035
370/329

OTHER PUBLICATIONS

Qualcomm Incorporated: "Resource Management for Enhanced Duplexing", 3GPP TSG RAN WG1 Meeting #104-e, R1-2101483, Jan. 25-Feb. 5, 2021, 8 pages.

* cited by examiner

*Primary Examiner* — Kevin C. Harper
(74) *Attorney, Agent, or Firm* — QUALCOMM Incorporated

(57) ABSTRACT

Aspects generally relate to wireless communication. In some aspects, an integrated access and backhaul (IAB) node may receive a configuration that indicates multiple resource patterns for one or more slots, wherein each resource pattern corresponds to a different set of one or more resource block (RB) sets within the one or more slots, and wherein each resource pattern includes at least one of: a resource availability pattern that indicates at least one of hard resources, soft resources, or not available resources for one or more RB sets corresponding to that resource pattern, or a resource directionality pattern that indicates at least one of uplink resources, downlink resources, or flexible resources for the one or more RB sets corresponding to that resource pattern. The IAB node may apply a resource pattern, of the multiple resource patterns, based at least in part on the configuration. Numerous other aspects are described.

30 Claims, 17 Drawing Sheets

INDICATION OF A RESOURCE PATTERN FOR FREQUENCY DIVISION MULTIPLEXING WITHIN A COMPONENT CARRIER FOR A WIRELESS MULTI HOP NETWORK

CROSS-REFERENCE TO RELATED APPLICATION

This patent application claims priority to U.S. Provisional Patent Application No. 63/167,970, filed on Mar. 30, 2021, entitled "INDICATION OF A RESOURCE PATTERN FOR FREQUENCY DIVISION MULTIPLEXING WITHIN A COMPONENT CARRIER FOR A WIRELESS MULTI HOP NETWORK," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for indication of a resource pattern for frequency division multiplexing within a component carrier for a wireless multi-hop network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by an integrated access and backhaul (IAB) node includes receiving a configuration that indicates multiple resource patterns for one or more slots, wherein each resource pattern corresponds to a different set of one or more resource block (RB) sets within the one or more slots and within a same component carrier, and wherein each resource pattern includes at least one of: a resource availability pattern that indicates at least one of hard resources, soft resources, or not available resources for one or more RB sets corresponding to that resource pattern, or a resource directionality pattern that indicates at least one of uplink resources, downlink resources, or flexible resources for the one or more RB sets corresponding to that resource pattern; and applying one or more resource patterns, of the multiple resource patterns, based at least in part on the configuration.

In some aspects, a method of wireless communication performed by a control node includes transmitting a configuration that indicates multiple resource patterns for one or more slots, wherein each resource pattern corresponds to a different set of one or more RB sets within the one or more slots and within a same component carrier, and wherein each resource pattern includes at least one of: a resource availability pattern that indicates at least one of hard resources, soft resources, or not available resources for one or more RB sets corresponding to that resource pattern, or a resource directionality pattern that indicates at least one of uplink resources, downlink resources, or flexible resources for the one or more RB sets corresponding to that resource pattern; and applying one or more resource patterns, of the multiple resource patterns, based at least in part on the configuration.

In some aspects, an IAB node for wireless communication includes a memory and one or more processors, coupled to the memory, configured to receive a configuration that indicates multiple resource patterns for one or more slots, wherein each resource pattern corresponds to a different set of one or more RB sets within the one or more slots and within a same component carrier, and wherein each resource pattern includes at least one of: a resource availability pattern that indicates at least one of hard resources, soft resources, or not available resources for one or more RB sets corresponding to that resource pattern, or a resource directionality pattern that indicates at least one of uplink resources, downlink resources, or flexible resources for the one or more RB sets corresponding to that resource pattern; and apply one or more resource patterns, of the multiple resource patterns, based at least in part on the configuration.

In some aspects, a control node for wireless communication includes a memory and one or more processors, coupled to the memory, configured to transmit a configuration that indicates multiple resource patterns for one or more slots, wherein each resource pattern corresponds to a different set of one or more RB sets within the one or more slots and within a same component carrier, and wherein each resource pattern includes at least one of: a resource availability pattern that indicates at least one of hard resources, soft resources, or not available resources for one or more RB sets corresponding to that resource pattern, or a resource directionality pattern that indicates at least one of uplink resources, downlink resources, or flexible resources for the one or more RB sets corresponding to that resource pattern; and apply one or more resource patterns, of the multiple resource patterns, based at least in part on the configuration.

In some aspects, a non-transitory computer-readable medium storing a set of instructions for wireless communication includes one or more instructions that, when executed by one or more processors of an IAB node, cause the IAB network node to receive a configuration that indicates multiple resource patterns for one or more slots, wherein each resource pattern corresponds to a different set of one or more RB sets within the one or more slots and within a same component carrier, and wherein each resource pattern includes at least one of: a resource availability pattern that indicates at least one of hard resources, soft resources, or not available resources for one or more RB sets corresponding to that resource pattern, or a resource directionality pattern that indicates at least one of uplink resources, downlink resources, or flexible resources for the one or more RB sets corresponding to that resource pattern; and apply one or more resource patterns, of the multiple resource patterns, based at least in part on the configuration.

In some aspects, a non-transitory computer-readable medium storing a set of instructions for wireless communication includes one or more instructions that, when executed by one or more processors of a control node, cause the control node to transmit a configuration that indicates multiple resource patterns for one or more slots, wherein each resource pattern corresponds to a different set of one or more RB sets within the one or more slots and within a same component carrier, and wherein each resource pattern includes at least one of: a resource availability pattern that indicates at least one of hard resources, soft resources, or not available resources for one or more RB sets corresponding to that resource pattern, or a resource directionality pattern that indicates at least one of uplink resources, downlink resources, or flexible resources for the one or more RB sets corresponding to that resource pattern; and apply one or more resource patterns, of the multiple resource patterns, based at least in part on the configuration.

In some aspects, an apparatus for wireless communication includes means for receiving a configuration that indicates multiple resource patterns for one or more slots, wherein each resource pattern corresponds to a different set of one or more RB sets within the one or more slots and within a same component carrier, and wherein each resource pattern includes at least one of: a resource availability pattern that indicates at least one of hard resources, soft resources, or not available resources for one or more RB sets corresponding to that resource pattern, or a resource directionality pattern that indicates at least one of uplink resources, downlink resources, or flexible resources for the one or more RB sets corresponding to that resource pattern; and means for applying one or more resource patterns, of the multiple resource patterns, based at least in part on the configuration.

In some aspects, an apparatus for wireless communication includes means for transmitting a configuration that indicates multiple resource patterns for one or more slots, wherein each resource pattern corresponds to a different set of one or more RB sets within the one or more slots and within a same component carrier, and wherein each resource pattern includes at least one of: a resource availability pattern that indicates at least one of hard resources, soft resources, or not available resources for one or more RB sets corresponding to that resource pattern, or a resource directionality pattern that indicates at least one of uplink resources, downlink resources, or flexible resources for the one or more RB sets corresponding to that resource pattern; and means for applying one or more resource patterns, of the multiple resource patterns, based at least in part on the configuration.

Aspects generally include a method, apparatus, system, computer program product, non-transitory computer-readable medium, user equipment, network entity, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
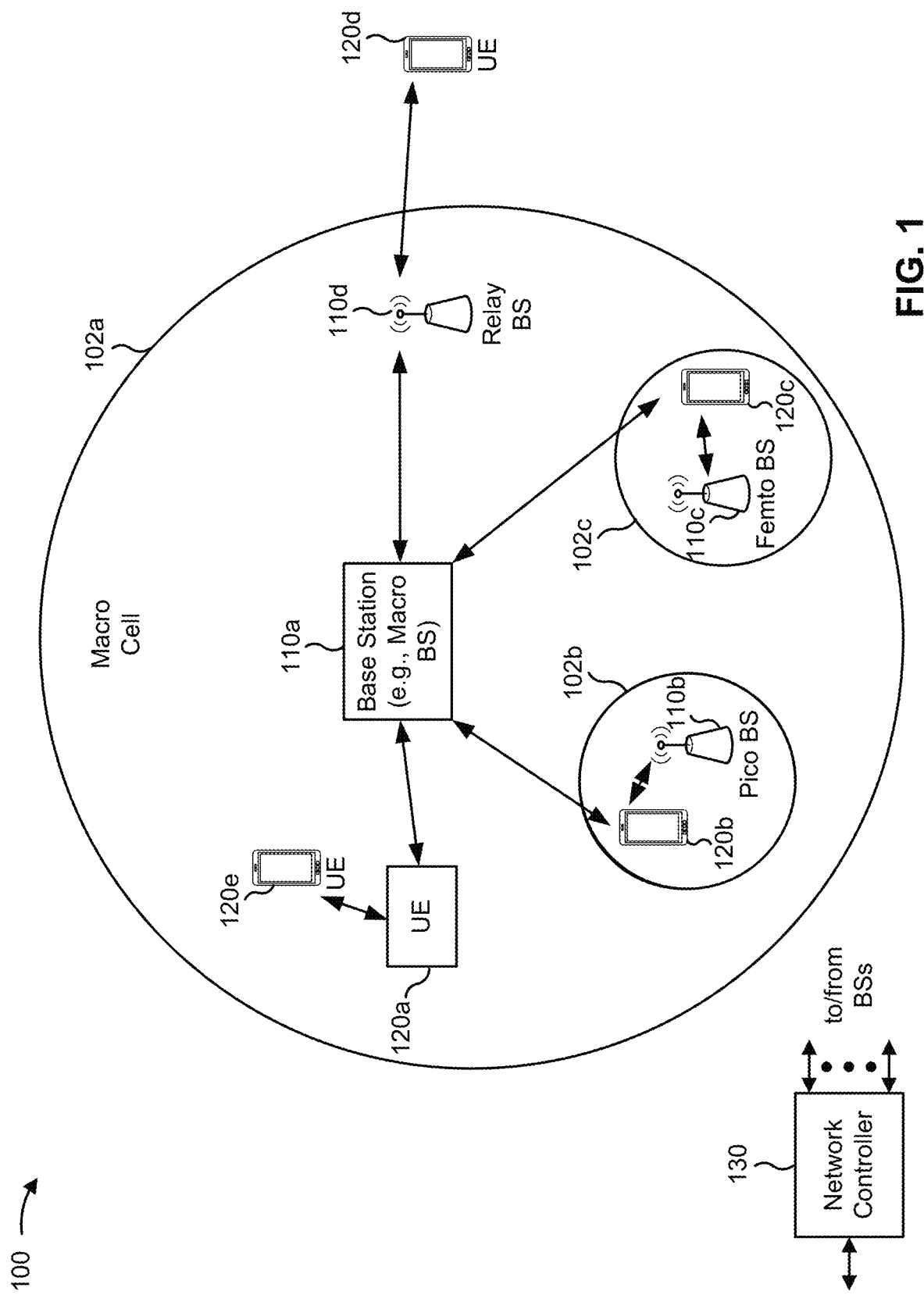
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
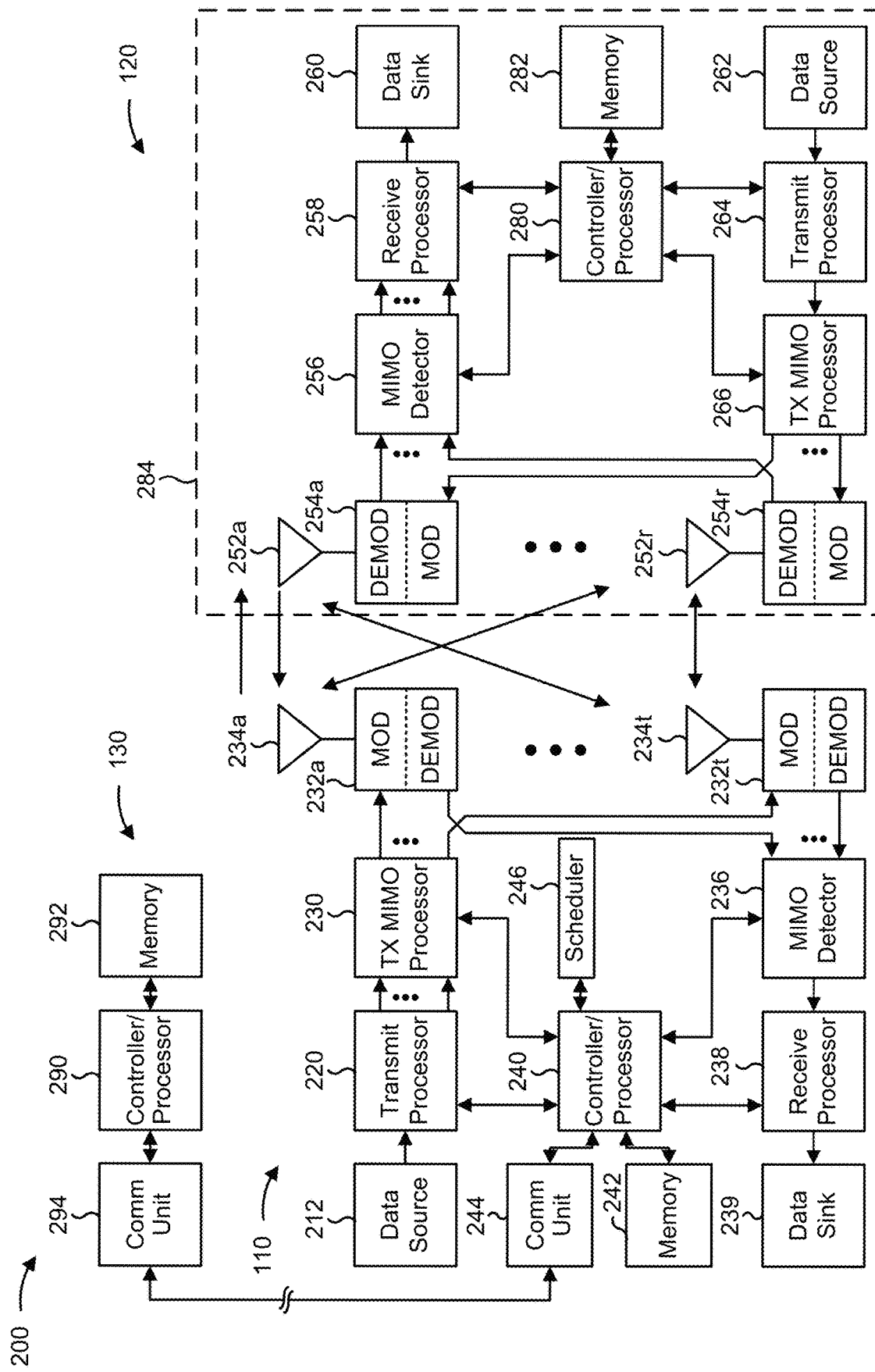
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-14).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-14).

The controller/processor 240 of the base station 110, the controller/processor 280 of the UE 120, and/or any other component(s) of FIG. 2 may perform one or more techniques associated with a resource pattern indication for frequency division multiplexing within a component carrier for a wireless multi-hop network, as described in more detail elsewhere herein. For example, the controller/processor 240 of the base station 110, the controller/processor 280 of the UE 120, and/or any other component(s) of FIG. 2 may perform or direct operations of, for example, process 1300 of FIG. 13, process 1400 of FIG. 14, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1300 of FIG. 13, process 1400 of FIG. 14, and/or other processes as described herein. In some examples, executing instructions may include running the instructions, converting the instructions, compiling the instructions, and/or interpreting the instructions, among other examples.

In some aspects, the IAB node includes means for receiving a configuration that indicates multiple resource patterns for one or more slots, wherein each resource pattern corresponds to a different set of one or more resource block (RB) sets within the one or more slots and within a same component carrier, and wherein each resource pattern includes at least one of: a resource availability pattern that indicates at least one of hard resources, soft resources, or not available resources for one or more RB sets corresponding to that resource pattern, or a resource directionality pattern that indicates at least one of uplink resources, downlink resources, or flexible resources for the one or more RB sets corresponding to that resource pattern; or means for applying one or more resource patterns, of the multiple resource patterns, based at least in part on the configuration. In some aspects, the means for the IAB node to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the control node includes means for transmitting a configuration that indicates multiple resource patterns for one or more slots, wherein each resource pattern corresponds to a different set of one or more resource block (RB) sets within the one or more slots and within a same component carrier, and wherein each resource pattern includes at least one of: a resource availability pattern that indicates at least one of hard resources, soft resources, or not available resources for one or more RB sets corresponding to that resource pattern, or a resource directionality pattern that indicates at least one of uplink resources, downlink resources, or flexible resources for the one or more RB sets corresponding to that resource pattern; or means for applying one or more resource patterns, of the multiple resource patterns, based at least in part on the configuration. In some aspects, the means for the control node to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
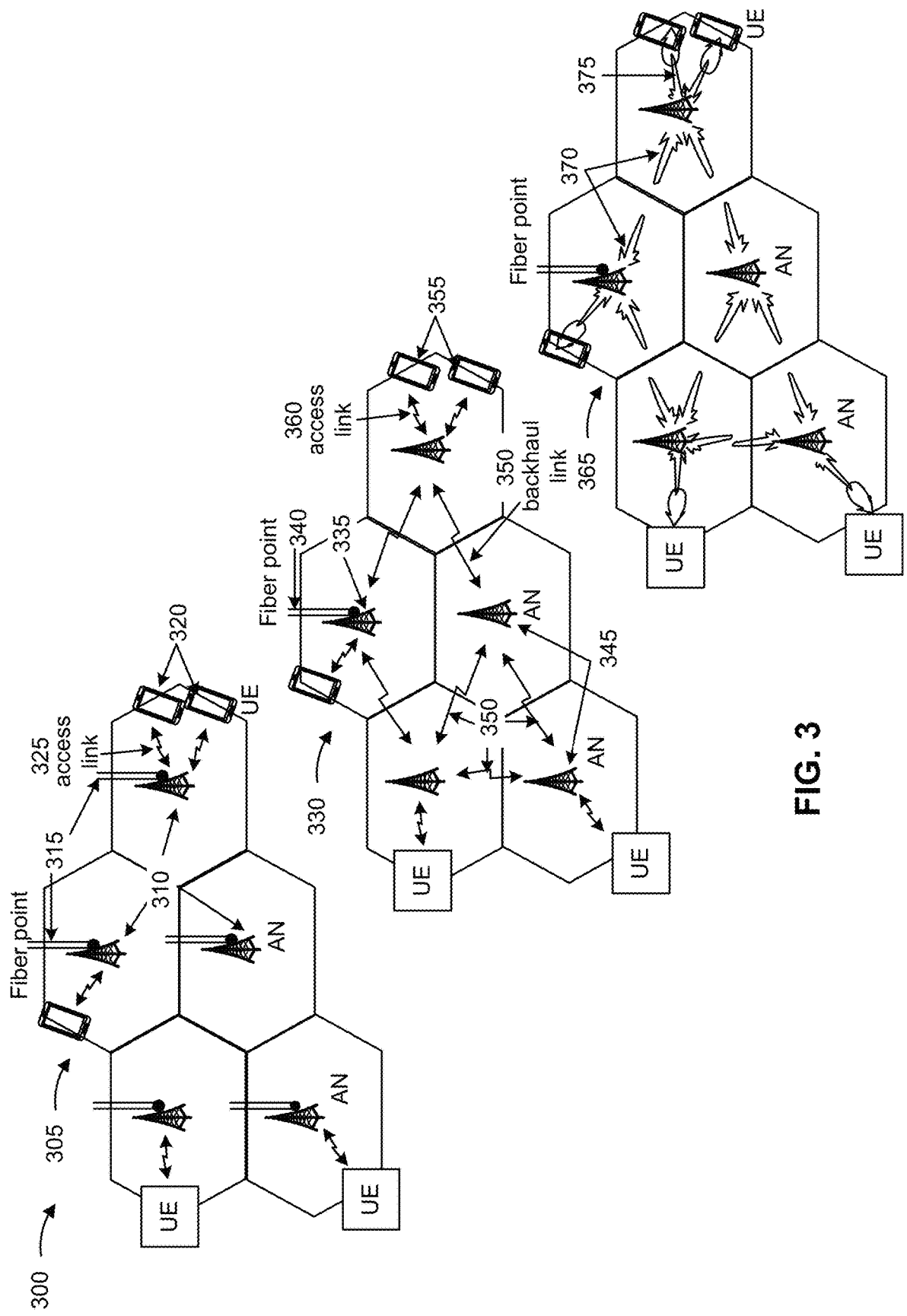
FIG. 3 is a diagram illustrating examples of radio access networks, in accordance with the present disclosure.

FIG. 3 is a diagram illustrating examples 300 of radio access networks, in accordance with the present disclosure.

As shown by reference number 305, a traditional (e.g., 3G, 4G, or LTE) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network may include a wireless backhaul network, sometimes referred to as an IAB network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network or a device-to-device network). In this case, "anchor node" may refer to a UE that is directly in communication with a base station (e.g., an anchor base station or a non-anchor base station).

In an IAB network, resource scheduling is more complicated than in a traditional radio access network because communications among multiple nodes along a route to an end device (e.g., a UE 120) may need to be coordinated, and because a parent IAB node (which may be one of multiple parent IAB nodes) may communicate with multiple child IAB nodes, some or all of which may communicate with grandchild IAB nodes, and so on. Some techniques and apparatuses described herein enable increased flexibility in scheduling communications in an IAB network to account for more complicated scheduling scenarios as compared to a traditional radio access network.

As indicated above, FIG. 3 is provided as an example. Other examples may differ from what is described with regard to FIG. 3.

Figure 4:
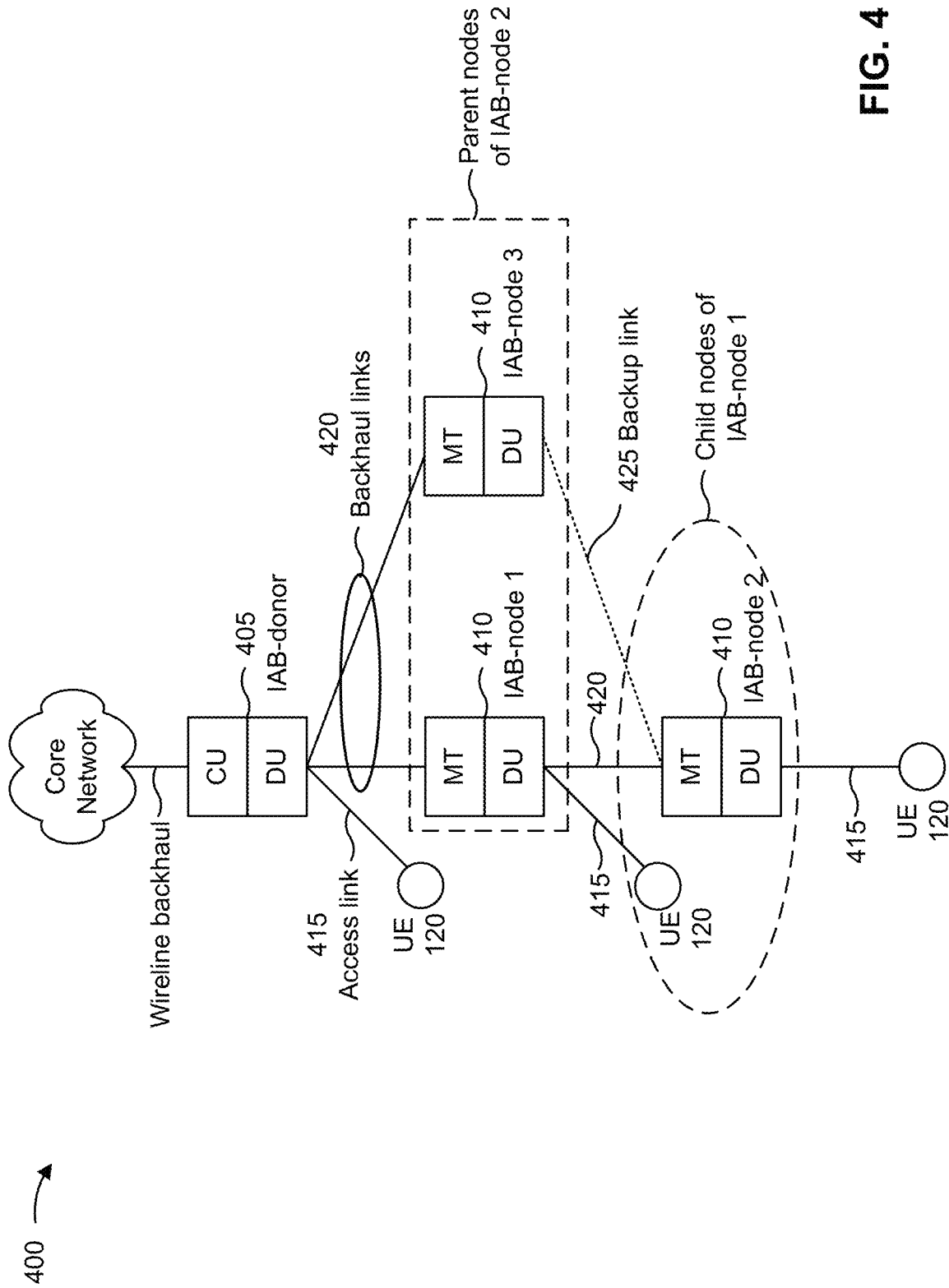
FIG. 4 is a diagram illustrating an example of an integrated access and backhaul (IAB) network architecture, in accordance with the present disclosure.

FIG. 4 is a diagram illustrating an example 400 of an IAB network architecture, in accordance with the present disclosure.

As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (e.g., AMF). In some aspects, an IAB donor 405 may include a base station 110, such as an anchor base station, as described above in connection with 3. As shown, an IAB donor 405 may include a central unit (CU), which may perform access node controller (ANC) functions and/or AMF functions. The CU may configure a distributed unit (DU) of the IAB donor 405 and/or may configure one or more IAB nodes 410 (e.g., an MT and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message or an F1 application protocol (F1-AP) message).

As further shown in FIG. 4, the IAB network may include IAB nodes 410 (shown as IAB-node 1, IAB-node 2, and IAB-node 3) that connect to the core network via the IAB donor 405. As shown, an IAB node 410 may include mobile termination (MT) functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node (or a parent network node) of the second node, and the second node may be referred to as a child node (or a child network node) of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, and/or spatial resources) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, and/or becomes overloaded, among other examples. For example, a backup link 425 between IAB-node 2 and IAB-node 3 may be used for backhaul communications if a primary backhaul link between IAB-node 2 and IAB-node 1 fails. As used herein, "node" or "wireless node" may refer to an IAB donor 405 or an IAB node 410.

As described above in connection with FIG. 3, resource scheduling is more complicated in an IAB network as compared to a traditional radio access network, and some techniques and apparatuses described herein enable increased flexibility in scheduling communications in an IAB network to account for these more complicated scheduling scenarios.

As indicated above, FIG. 4 is provided as an example. Other examples may differ from what is described with regard to FIG. 4.

Figure 5:
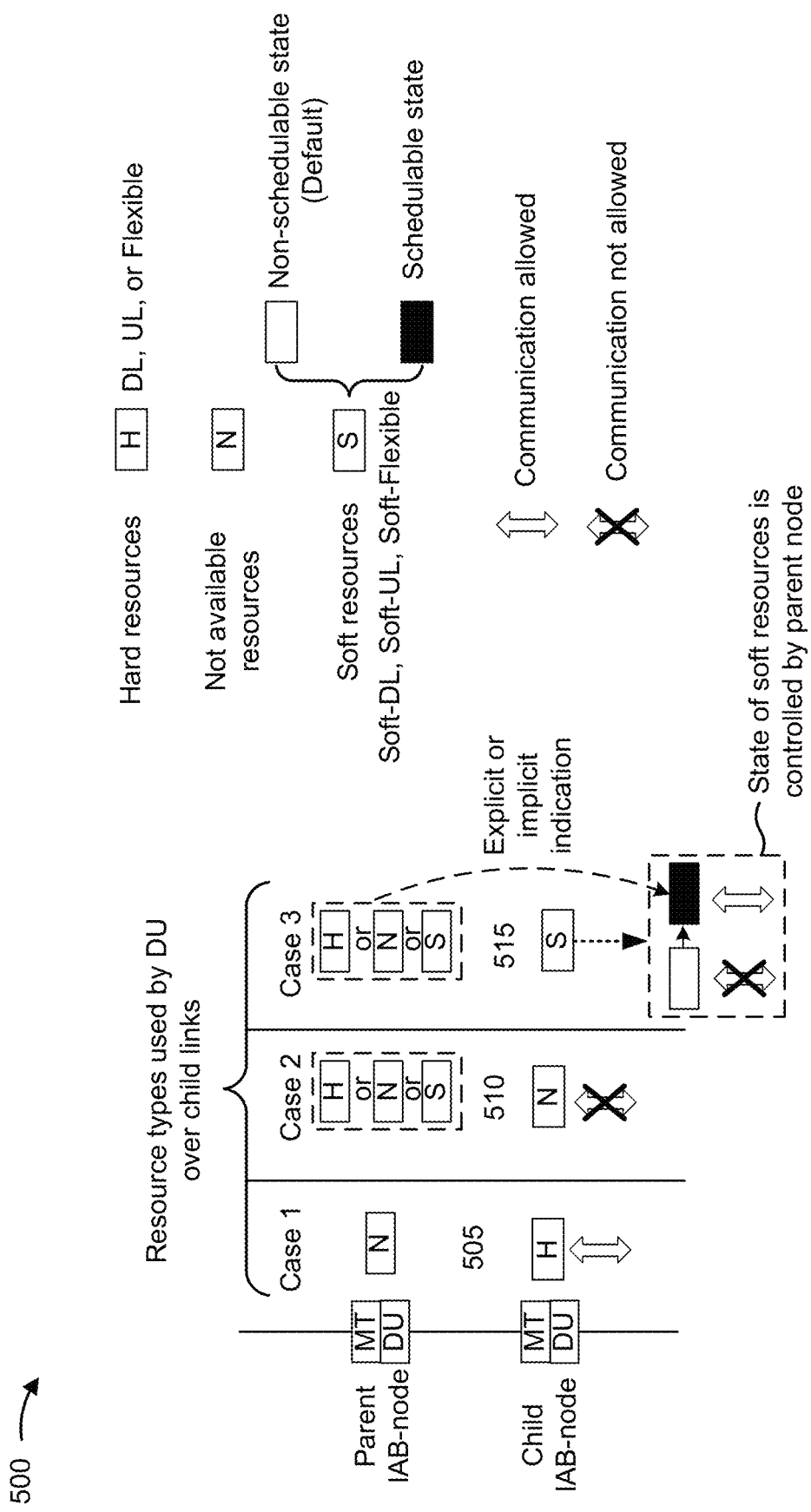
FIG. 5 is a diagram illustrating an example of resource types in an IAB network, in accordance with the present disclosure.

FIG. 5 is a diagram illustrating an example 500 of resource types in an IAB network, in accordance with the present disclosure.

In an IAB network, time domain resources (sometimes referred to as time resources) may be configured as downlink-only (sometimes referred to as "downlink" rather than "downlink-only"), uplink-only (sometimes referred to as "uplink" rather than "uplink-only"), flexible, or not available (e.g., unavailable). When a time resource is configured as downlink-only for a wireless node, that time resource may be available for only downlink communications of the wireless node, and not uplink communications. Similarly, when a time resource is configured as uplink-only for a wireless node, that time resource may be available for only uplink communications of the wireless node, and not downlink communications. When a time resource is configured as flexible for a wireless node, that time resource may be available for both downlink communications and uplink communications of the wireless node. When a time resource is configured as not available for a wireless node, that time resource may not be used for any communications of the wireless node.

Examples of downlink communications include synchronization signal blocks (SSBs), channel state information reference signals (CSI-RS), physical downlink control channel (PDCCH) communications, and/or physical downlink shared channel (PDSCH) communications. Examples of uplink communications include physical random access channel (PRACH) communications, physical uplink control channel (PUCCH) communications, physical uplink shared channel (PUSCH) communications, and/or sounding reference signals (SRSs).

Time resources in an IAB network that are configured as downlink-only, uplink-only, or flexible may be further configured as hard resources or soft resources. When a time resource is configured as a hard resource for a wireless node, that time resource is always available for communications of the wireless node. For example, a hard downlink-only time resource is always available for only downlink communications of the wireless node, a hard uplink-only time resource is always available for only uplink communications of the wireless node, and a hard flexible time resource is always available for uplink and downlink communications of the wireless node.

When a time resource is configured as a soft resource for a wireless node, the availability of that time resource is controlled by a parent node of the wireless node. For example, the parent node may indicate (e.g., explicitly or implicitly) whether a soft time resource is available for communications of the wireless node. Thus, a soft time resource may be in one of two states: a schedulable state (e.g., when the soft time resource is available for scheduling and/or communications of the wireless node) and a non-schedulable state (e.g., when the soft time resource is not available for scheduling and is not available for communications of the wireless node).

For example, a soft downlink-only time resource is only available for downlink communications of the wireless node when a parent node of the wireless node indicates that the soft downlink-only time resource is available. Similarly, a soft uplink-only time resource is only available for uplink communications of the wireless node when a parent node of the wireless node indicates that the soft uplink-only time resource is available. A soft flexible time resource is only available for uplink and downlink communications of the wireless node when a parent node of the wireless node indicates that the soft flexible time resource is available.

As an example, and as shown by reference number 505, a time resource may be configured as hard for a child node, and may be configured as not available for a parent node of the child node. In this case, the parent node cannot communicate using that time resource, but the child node can schedule communications in that time resource and/or communicate using that time resource. This configuration may reduce interference between the parent node and the child node and/or may reduce scheduling conflicts between the parent node and the child node.

As another example, and as shown by reference number 510, a time resource may be configured as not available for the child node, and may be configured as hard, soft, or not available for the parent node (e.g., depending on a network configuration, network conditions, and/or a configuration of a parent node of the parent node). In this case, the child node cannot schedule communications in that time resource and cannot communicate using that time resource.

As another example, and as shown by reference number 515, a time resource may be configured as soft for the child node, and may be configured as hard, soft, or not available for the parent node (e.g., depending on a network configuration, network conditions, and/or a configuration of a parent node of the parent node). In this case, the child node cannot schedule or communicate using the time resource unless the child node receives an indication (e.g., a release indication), from the parent node (e.g., explicitly or implicitly), that the time resource is available (i.e., released) for use by the child node. If the child node receives such an indication, then the child node can schedule communications in that time resource and/or communicate using that time resource.

In some examples, an IAB node may receive a resource configuration that indicates downlink-only resources, uplink-only resources, flexible resources, hard resources, soft resources, and/or not available resources. In some examples, a resource configuration may apply to an entire component carrier (CC) in the frequency domain (e.g., the resource configuration applies to all frequency domain resources within a CC configured for the IAB network and/or the IAB node). However, this approach is relatively inflexible as compared to allowing different resource configurations within a CC. Some techniques and apparatuses described herein enable increased scheduling flexibility by enabling multiple (different) resource configurations within a CC.

One approach to enable multiple resource configurations within a CC is to configure a resource configuration per non-overlapping bandwidth parts (BWPs) within a CC, such that different BWPs within a CC are associated with different resource configurations. However, while a BWP has a flexible frequency domain location within a CC, configurations of the BWP apply to all time domain resources (e.g., all slots) within the BWP. Thus, this approach would require all slots within the BWP to have the same resource configuration, which limits scheduling flexibility. As a result, this approach does not enable slot-specific frequency-division multiplexing (FDM) with different FDM partitions or different resource configurations for different slots within the BWP.

Furthermore, this approach limits dynamic coordination of resource patterns (e.g., a pattern of downlink-only resources, uplink-only resources, flexible resources, hard resources, soft resources, and/or not available resources) among IAB nodes to account for different traffic patterns, different network loads, and/or different traffic priorities. For example, different resource configurations could be applied to different slots by switching from a first BWP (associated with a first resource configuration) to a second BWP (associated with a second resource configuration). However, this would require reconfiguration of IAB nodes to switch BWPs, which would introduce delays in communications.

Some techniques and apparatuses described herein enable increased scheduling flexibility by applying different resource configurations per resource block (RB) set (e.g., a group of frequency domain resources) within a CC and per slot. This allows for a resource configuration that is flexible in both the time domain and the frequency domain. Furthermore, some techniques and apparatuses described herein enable dynamic switching between resource configurations with low latency (e.g., as compared to requiring BWP switching to switch resource configurations).

As indicated above, FIG. 5 is provided as an example. Other examples are possible and may differ from what was described with regard to FIG. 5.

Figure 6:
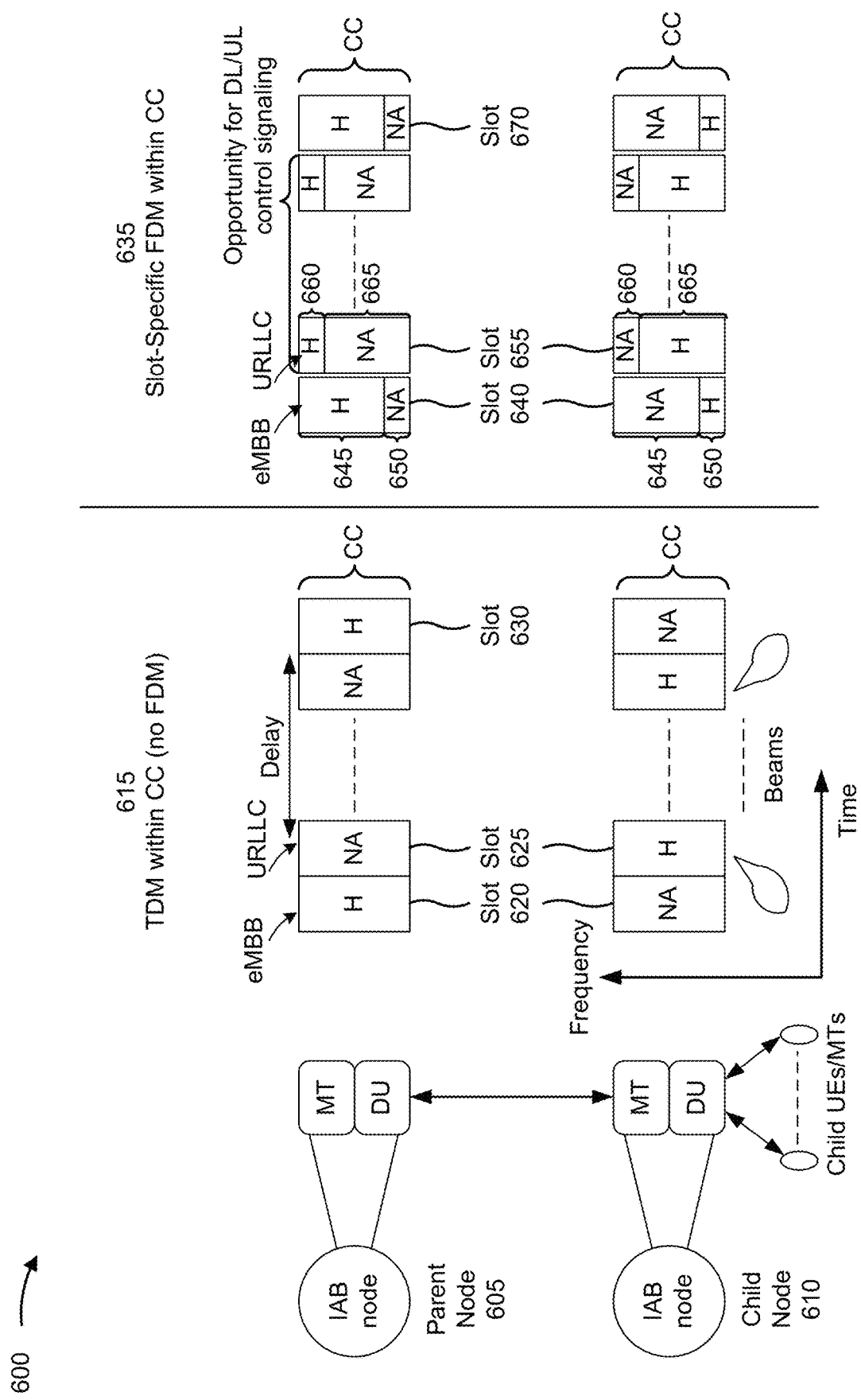
FIG. 6 is a diagram illustrating an example of slot-specific frequency-division multiplexing (FDM) within a component carrier (CC), in accordance with the present disclosure.

FIG. 6 is a diagram illustrating an example 600 of slot-specific FDM within a CC, in accordance with the present disclosure. As shown in FIG. 6, a parent node 605 (e.g., an IAB donor or a first IAB node) and a child node 610 (e.g., a second IAB node) may communicate with one another.

As shown by reference number 615, if time-division multiplexing (TDM), but not FDM, is used within a CC, then all frequency domain resources within the CC (e.g., all resource blocks (RBs), RB sets, and/or subcarriers within the CC) in a particular time domain resource (e.g., a slot in example 600) at a particular node have the same resource availability type. A resource availability type may include hard, soft, or not available, as described elsewhere herein. For example, all frequency domain resources within the CC in a first slot 620 are configured as hard resources (e.g., hard downlink-only, hard uplink-only, or hard flexible) at the parent node 605. Similarly, all frequency domain resources within the CC in the first slot 620 are configured as not available at the child node 610. As another example, all frequency domain resources within the CC in a second slot 625 are configured as not available at the parent node 605, and all frequency domain resources within the CC in the second slot 625 are configured as hard resources (e.g., hard downlink-only, hard uplink-only, or hard flexible) at the child node 610.

In example 600, low priority traffic (shown as enhanced mobile broadband (eMBB) traffic) is available for transmission to the parent node 605 via the CC in the first slot 620, and high priority traffic (shown as ultra reliable low latency communication (URLLC) traffic) is available for transmission to the parent node 605 via the CC in the second slot 625. However, because the second slot 625 is configured as not available across all frequency domain resources within the CC at the parent node 605, reception and/or transmission of the URLLC traffic by the parent node 605 is delayed until a later slot 630. In some aspects, the delay may be span several slots because the child node 610 may relay the eMBB traffic, received from the parent node 605, to several child nodes of the child node 610 (e.g., several UEs or IAB nodes) using multiple beams, with one beam per slot.

As shown by reference number 635, if FDM is used within a CC, then different frequency domain resources within the CC (e.g., different RBs, RB sets, and/or subcarriers within the CC) in a particular time domain resource (e.g., a slot in example 600) at a particular node can have different resource availability types. For example, a first slot 640 may include a first set of frequency domain resources 645 (e.g., a first RB set) within a CC and a second set of frequency domain resources 650 (e.g., a second RB set) within the CC. At the parent node 605, the first set of frequency domain resources 645 in the first slot 640 are configured as hard resources and the second set of frequency domain resources 650 in the first slot 640 are configured as not available. At the child node 610, the first set of frequency domain resources 645 in the first slot 640 are configured as not available, and the second set of frequency domain resources 650 in the first slot 640 are configured as hard resources. As another example, in a second slot 655 at the parent node 605, a first set of frequency domain resources 660 are configured as hard resources and a second set of frequency domain resources 665 are configured as not available. In the second slot 655 at the child node 610, the first set of frequency domain resources 660 are configured as not available and the second set of frequency domain resources 665 are configured as hard resources.

If different sets of frequency domain resources (sometimes referred to herein as "RB sets") within a CC and within a slot are capable of being configured with different resource availability types (e.g., hard, soft, or not available), then latency can be reduced. For example, if high priority traffic (shown as URLLC traffic) is available for transmission to the parent node 605 via the CC in the second slot 655, then the parent node 605 may be capable of receiving and/or transmitting the high priority traffic via the first set of frequency domain resources 660 configured as hard resources, rather than waiting until a later slot 670 to receive and/or transmit the high priority traffic. Some techniques and apparatuses enable different sets of frequency domain resources (or RB sets) within a CC and within a slot to be configured with different resource availability types, thereby reducing latency, increasing scheduling flexibility, and improving network resource utilization.

As indicated above, FIG. 6 is provided as an example. Other examples are possible and may differ from what was described with regard to FIG. 6.

Figure 7:
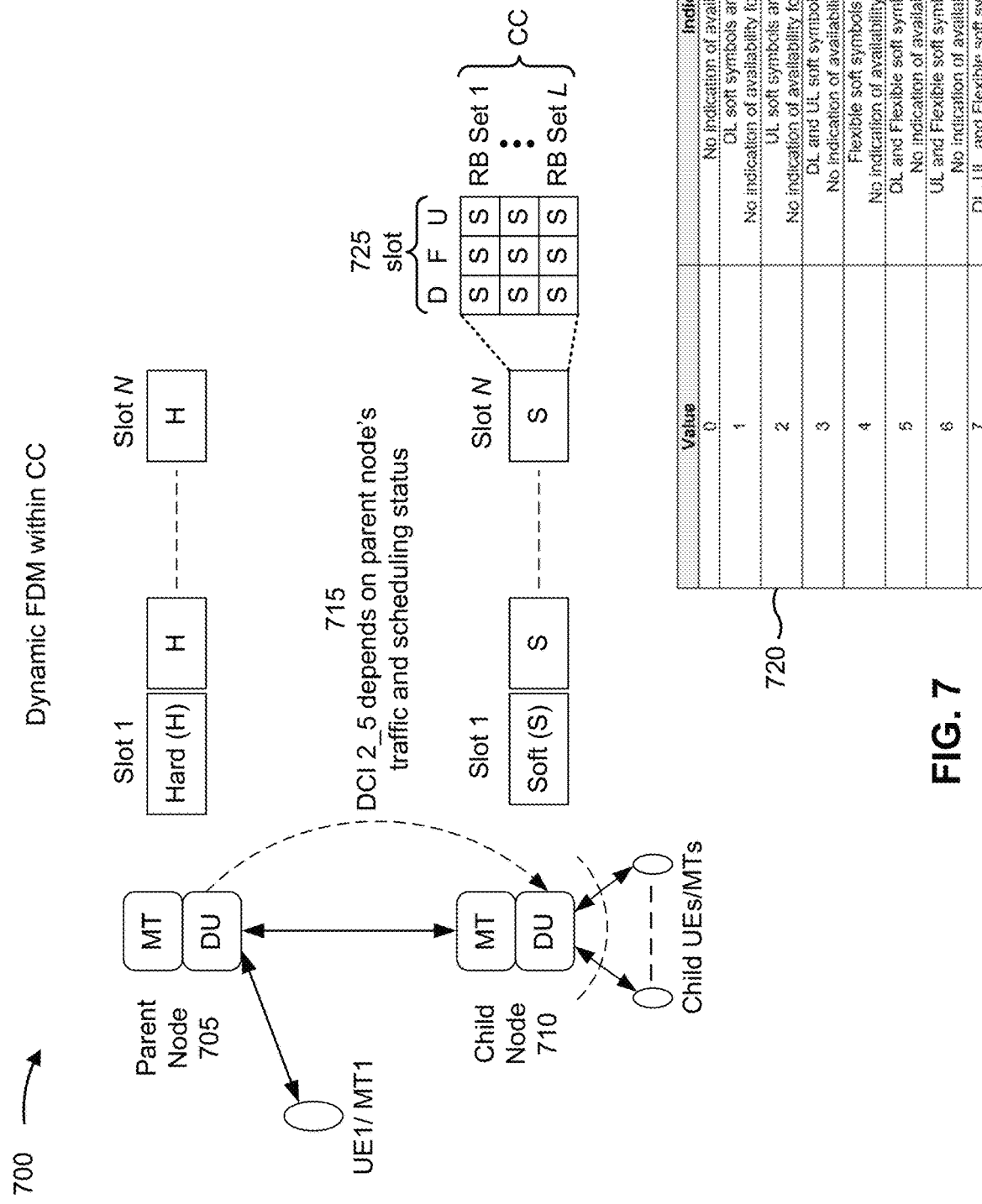
FIG. 7 is a diagram illustrating an example of dynamic FDM within a CC, in accordance with the present disclosure.

FIG. 7 is a diagram illustrating an example 700 of dynamic FDM within a CC, in accordance with the present disclosure. As shown in FIG. 7, a parent node 705 (e.g., an IAB donor or a first IAB node) and a child node 710 (e.g., a second IAB node) may communicate with one another.

As shown by reference number 715, the parent node 705 may transmit downlink control information (DCI), shown as DCI having DCI format 2_5, to the child node 710 to indicate availability of soft resources in a slot. As described above in connection with FIG. 5, when a resource is configured as a soft resource for a child node 710, the availability of that resource is controlled by the parent node 705. For example, the parent node 705 may use DCI (e.g., having DCI format 2_5) to indicate whether a soft resource is available for communications of the child node 710. The parent node 705 may control the availability of soft resources, such as based at least in part on a network traffic pattern associated with the parent node 705, a priority of network traffic associated with the parent node 705, and/or a scheduling status of the parent node 705. As shown by reference number 720, the parent node 705 may include a particular value, of a set of values, in the DCI to indicate availability of soft resources.

As shown by reference number 725, the indication in the DCI applies across all frequency domain resources (e.g., all RBs) in a symbol (which is a time domain resource portion of a slot). For example, if the DCI indicates that all downlink soft symbols are available (or similarly, that all resources in symbol 0 are soft symbols, or the like), then that indication applies across all RBs within the downlink soft symbols (or across all RBs within symbol 0). As described elsewhere herein, this limits scheduling flexibility and can result in underutilization of network resources.

Some techniques and apparatuses enable different RB sets (shown as RB set 1 through RB set L) within a CC and within a symbol (or within a set of symbols) to be configured with different resource availability patterns (e.g., hard, soft, or not available) and/or different resource directionality patterns (e.g., uplink-only, downlink-only, or flexible), thereby increasing scheduling flexibility and improving network resource utilization.

As indicated above, FIG. 7 is provided as an example. Other examples are possible and may differ from what was described with regard to FIG. 7.

Figure 8:
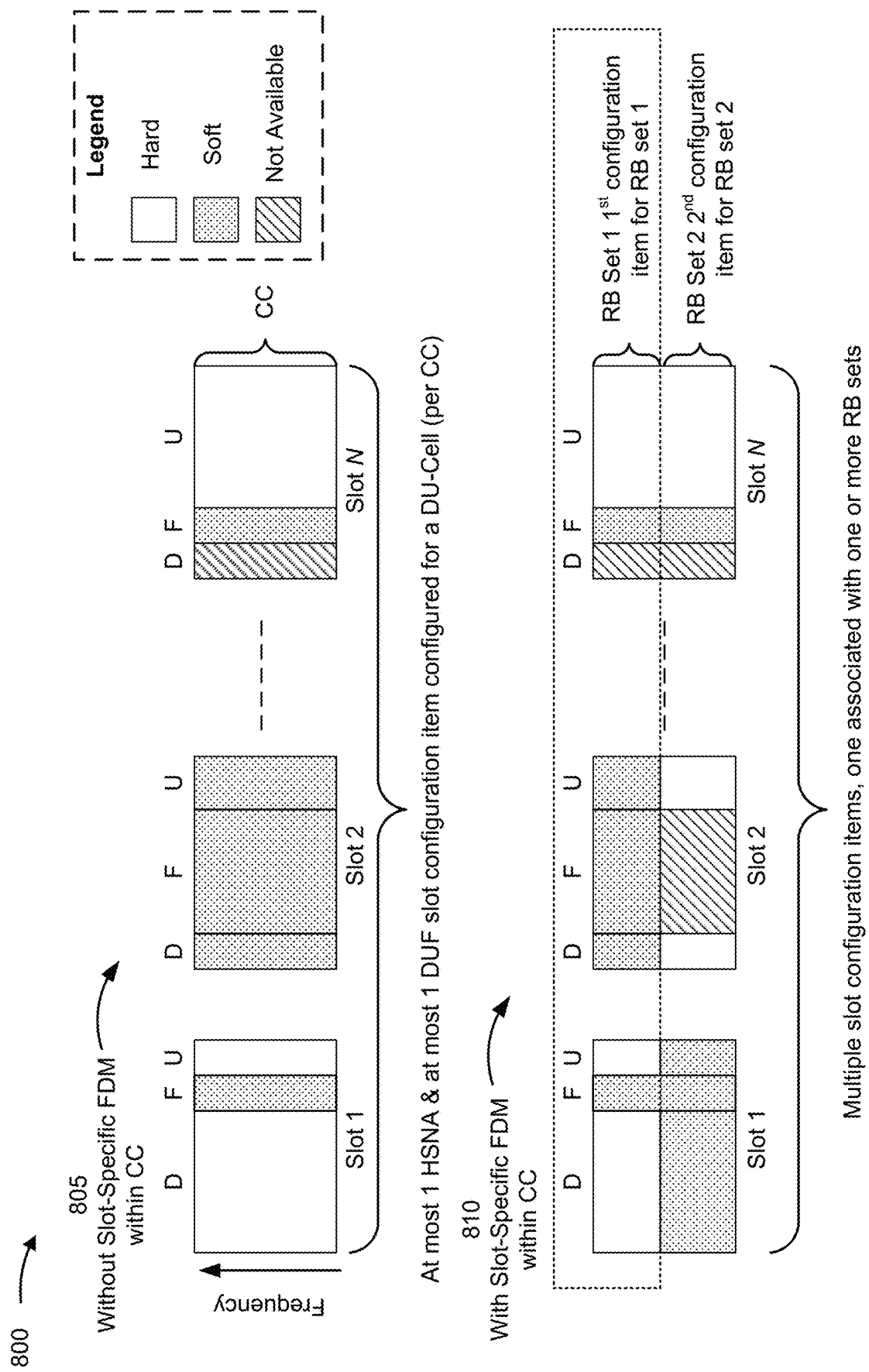
FIGS. 8-12 are diagrams illustrating examples of indicating a resource pattern for FDM within a CC for a wireless multi-hop network, in accordance with the present disclosure.

FIG. 8 is a diagram illustrating an example 800 of indicating a resource pattern for FDM within a CC for a wireless multi-hop network, in accordance with the present disclosure.

As shown by reference number 805, without slot-specific FDM within a CC, the resource availability type (e.g., hard, soft, or not available) is the same for all frequencies (e.g., all RBs) of a symbol (or a set of symbols). For example, in Slot 1 associated with reference number 805, all downlink-only symbols (shown as "D") are configured as hard resources, all flexible symbols (shown as "F") are configured as soft resources, and all uplink-only symbols (shown as "U") are configured as hard resources. Furthermore, the resource directionality type (e.g., uplink, downlink, or flexible) is the same for all frequencies (e.g., all RBs) of a symbol (or a set of symbols).

For example, in Slot 1 associated with reference number 805, if a symbol is a downlink symbol in one RB, then that symbol is a downlink symbol across all RBs in the CC. In this configuration, there can be at most one resource availability pattern (e.g., a pattern of at least one of hard, soft, and/or not available resources) per slot and at most one resource directionality pattern (e.g., a pattern of at least one of uplink, downlink, and/or flexible resources) per slot. A resource availability pattern is sometimes called a hard, soft, not available (HSNA) pattern, an HSNA configuration, or the like. A resource directionality pattern is sometimes called a downlink, uplink, flexible (DUF) pattern, a DUF configuration, or the like.

As shown by reference number 810, using slot-specific FDM within a CC, the resource availability type (e.g., hard, soft, or not available) can be different for different frequencies (e.g., different RBs) of a symbol (or a set of symbols). For example, in Slot 1 associated with reference number 810, the downlink-only symbols (shown as "D") are configured as hard resources for a first set of RBs (shown as "RB Set 1") and are configured as soft resources for a second set of RBs (shown as "RB Set 2"). Similarly, the uplink-only symbols (shown as "U") are configured as hard resources for RB Set 1 and are configured as soft resources for RB Set 2. In some aspects, the resource availability type can be the same for different frequencies (e.g., different RBs) of a symbol (or a set of symbols). For example, the flexible symbols (shown as "F") are configured as soft resources for both RB Set 1 and RB Set 2.

In this configuration, there can be multiple resource availability patterns (or HSNA patterns) per slot. Furthermore, as will be described in detail elsewhere herein, there can be multiple resource directionality patterns (or DUF patterns) per slot. As a result, scheduling flexibility can be improved, latency can be reduced, and network resource utilization can be improved, as described in more detail elsewhere herein.

As indicated above, FIG. 8 is provided as an example. Other examples are possible and may differ from what was described with regard to FIG. 8.

Figure 9:
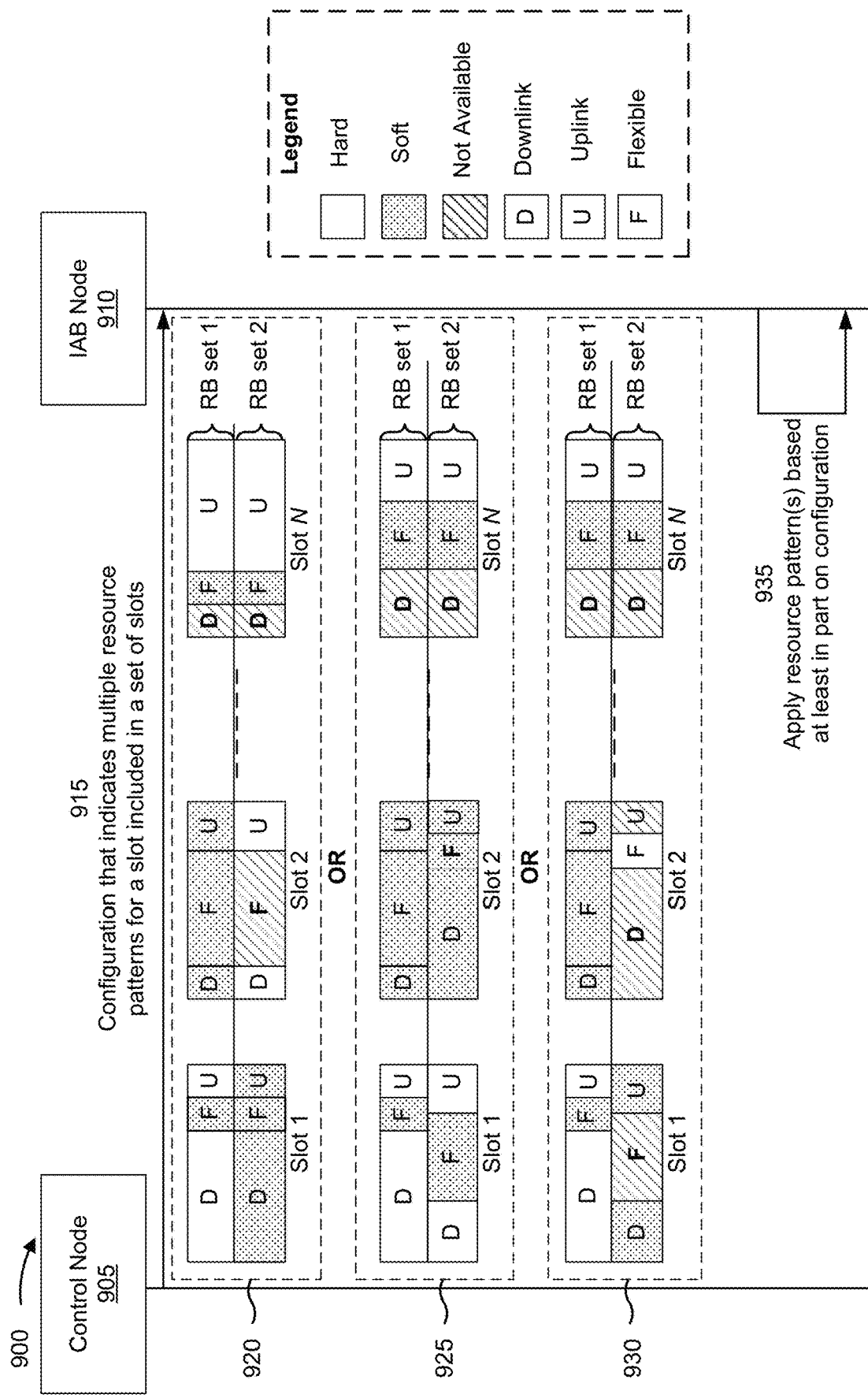

FIG. 9 is a diagram illustrating an example 900 of indicating a resource pattern for FDM within a CC for a wireless multi-hop network, in accordance with the present disclosure. As shown in FIG. 9, a control node 905 (e.g., an IAB donor) and an IAB node 910 may communicate with one another. In case the control node 905 is not a parent node of the IAB node 910, the control node 905 may communicate with the IAB node 910 over one or more intermediate IAB nodes.

As shown by reference number 915, the control node 905 may transmit, and the IAB node 910 may receive, a configuration that indicates multiple resource patterns for a slot. The slot may be included in a set of slots (e.g., one or more slots). In some aspects, the configuration may indicate the set of slots (e.g., a number of slots and/or a periodicity of the slot(s)) to which a resource pattern applies (or to which all of the multiple resource patterns apply). In some aspects, the configuration may indicate multiple resource patterns for the set of slots. In some aspects, each resource pattern, of the multiple resource patterns, corresponds to a different set of one or more RB sets within the slot (or within the set of slots) and within a same component carrier. Thus, a resource pattern may correspond to and/or may be applied to one or more RB sets, and different resource patterns may corresponds to different RB sets. In some aspects, the control node 905 may configure different resource patterns for different child nodes of the control node 905 and/or for different backhaul links used by the control node 905 to communicate. Additional details regarding signaling the multiple resource patterns are described below in connection with FIGS. 10 and 11.

In some aspects, an RB set may include a set of contiguous RBs (e.g., a set of contiguous or consecutive or adjacent subcarriers or frequency domain resources) within a CC. In some aspects, different RB sets may be mutually exclusive and may not overlap in the frequency domain. Thus, a first resource pattern may correspond to a first set of contiguous RBs within a CC, a second resource pattern may correspond to a second set of contiguous RBs within the CC, and so on. A CC may be divided into two, three, or more RB sets. In some aspects, the configuration may indicate a maximum number of RB sets into which a CC can be divided. Thus, the configuration may indicate a maximum number of RB sets, within the CC, to which resource patterns can be applied. Additionally, or alternatively, the configuration may indicate an actual number of RB sets, within the CC, to which resource patterns are to be applied. For example, the configuration may indicate the actual number of RB sets using a field or IE dedicated to indicating the actual number of RB sets. Alternatively, the configuration may indicate the actual number of RB sets using another field, such as a DUF slot configuration item field, an HSNA slot configuration item field, a time division duplexing (TDD) info field, and/or a frequency division duplexing (FDD) info field, as described in more detail below in connection with FIGS. 10 and 11.

In some aspects, each RB set within a CC is the same size, except for at most one RB set. For example, the size of an RB set may be determined based at least in part on the number of RB sets included in the CC. For example, the size of each RB sets within a CC (except for possibly one RB set within the CC) may be equal to the total number of RBs in the CC divided by the number of RB sets in the CC, rounded down to the nearest integer (e.g., size1=floor(total_Number_of_RBs/number_of_RBSets)). The remaining RB set, which may be a different size than the rest of the RB sets, may occupy the remaining RBs that are not included in the other RB sets (e.g., size2=total_Number_of_RBs−size1×(number_of_RBSets−1)). In this example, the size of the RB sets need not be signaled, thereby conserving signaling overhead. In some aspects, the control node 905 may signal the size(s) of the RB sets (e.g., a respective size of each RB set), such as in the configuration. In some aspects, the size(s) of the RB sets may be set according to a wireless communication standard.

A resource pattern may include a resource availability pattern and/or a resource directionality pattern. A resource availability pattern may indicate at least one of hard resources, soft resources, or not available resources for one or more RB sets that correspond to the resource availability pattern. For example, a resource availability pattern may indicate which symbols of a slot are configured as hard, which symbols of the slot are configured as soft, and/or which symbols of the slot are configured as not available. The resource availability pattern may provide this indication for multiple slots, and different slots may be associated with different patterns of hard symbols, soft symbols, and not available symbols.

A resource directionality pattern may indicate at least one of uplink resources (e.g., uplink-only resources), downlink resources (e.g., downlink-only resources), or flexible resources for one or more RB sets that correspond to the resource directionality pattern. For example, a resource directionality pattern may indicate which symbols of a slot are configured as downlink symbols, which symbols of the slot are configured as uplink symbols, and/or which symbols of the slot are configured as flexible symbols. The resource directionality pattern may provide this indication for multiple slots, and different slots may be associated with different patterns of downlink symbols, uplink symbols, and flexible symbols.

In some aspects, the control node 905 may transmit the configuration, that indicates the multiple resource patterns, in a configuration message, such as an RRC message (e.g., an RRC configuration message or an RRC reconfiguration message) and/or an F1-AP message. Additionally, or alternatively, a parent node of the IAB node 910 may transmit the configuration in a medium access control (MAC) control element (CE) (collectively, MAC-CE). In some aspects, an IAB donor CU (e.g., a control node) may generate the configuration, and the configuration may be transmitted via one or more hops (e.g., backhaul links) from the IAB donor CU to the IAB node 910 via one or more intermediate IAB nodes.

Reference number 920 shows an example where the configuration indicates different resource availability patterns for different RB sets within a slot, and indicates the same resource directionality pattern for different RB sets within a slot. For example, in Slot 1, the same first set of symbols are configured as downlink symbols across two RB sets (shown as RB set 1 and RB set 2), the same second set of symbols are configured as flexible symbols across the two RB sets, and the same third set of symbols are configured as uplink symbols across the two RB sets. For example, symbols 0 through 9 may be configured as downlink symbols for both RB sets, symbols 10 and 11 may be configured as flexible symbols for both RB sets, and symbols 12 and 13 may be configured as uplink symbols for both RB sets.

In the example of reference number 920, the downlink symbols are configured as hard symbols in RB set 1 and are configured as soft symbols in RB set 2. Similarly, the uplink symbols are configured as hard symbols in RB set 1 and are configured as soft symbols in RB set 2. In some aspects, a set of symbols may be configured with the same resource availability type in different resource availability patterns, such as the flexible symbols in Slot 1, which are configured as soft symbols for both RB set 1 and RB set 2. In some aspects, the resource availability pattern and/or the resource directionality pattern for a particular slot may have the same intra-slot configuration across different resource patterns for the set of slots, such as is shown with Slot N.

Reference number 925 shows an example where the configuration indicates different resource directionality patterns for different RB sets within a slot, and indicates the same resource availability pattern for different RB sets within a slot. For example, in Slot 1, different first sets of symbols are configured as downlink symbols across two RB sets (shown as RB set 1 and RB set 2), different second sets of symbols are configured as flexible symbols across the two RB sets, and different third sets of symbols are configured as uplink symbols across the two RB sets. For example, symbols 0 through 9 may be configured as downlink symbols for the first RB set, and symbols 0 through 3 may be configured as downlink symbols for the second RB set. As another example, symbols 10 and 11 may be configured as flexible symbols for the first RB set, and symbols 4 through 10 may be configured as flexible symbols for the second RB set. As another example, symbols 12 and 13 may be configured as uplink symbols for the first RB set, and symbols 11 through 13 may be configured as uplink symbols for the second RB set.

In the example of reference number 925, the downlink symbols are configured as hard symbols in both RB set 1 and RB set 2. Similarly, the flexible symbols are configured as soft symbols in both RB set 1 and RB set 2. Similarly, the uplink symbols are configured as hard symbols in both RB set 1 and RB set 2. In some aspects, a set of symbols may be configured with the same resource directionality type in different resource directionality patterns, such as by configuring the same resource directionality type for the same set of symbols across two or more RB sets. In some aspects, the resource availability pattern and/or the resource directionality pattern for a particular slot may have the same intra-slot configuration across different resource patterns for the set of slots, such as is shown with Slot N.

Reference number 930 shows an example where the configuration indicates different resource directionality patterns for different RB sets within a slot, and indicates different resource availability patterns for different RB sets within a slot. For example, in Slot 1, different first sets of symbols are configured as downlink symbols across two RB sets (shown as RB set 1 and RB set 2), different second sets of symbols are configured as flexible symbols across the two RB sets, and different third sets of symbols are configured as uplink symbols across the two RB sets, in a similar manner as described above in connection with reference number 925.

In the example of reference number 930, the downlink symbols are configured as hard symbols in RB set 1 and are configured as soft symbols in RB set 2. Similarly, the flexible symbols are configured as soft symbols in RB set 1 and are configured as not available symbols in RB set 2. Similarly, the uplink symbols are configured as hard symbols in RB set 1 and are configured as soft symbols in RB set 2. In some aspects, a set of symbols may be configured with the same resource availability type and/or the same resource directionality type in different resource patterns. In some aspects, the resource availability pattern and/or the resource directionality pattern for a particular slot may have the same intra-slot configuration across different resource patterns for the set of slots, such as is shown with Slot N.

In some aspects, the control node 905 may transmit (e.g., in the configuration transmitted to the IAB node 910) an indication of an association between resource patterns and corresponding RB sets. For example, the control node 905 may indicate that a first resource pattern corresponds to a first RB set (e.g., by identifying the RB set and/or a set of RBs included in the RB set), that a second resource pattern corresponds to a second RB set, and so on. In some aspects, the control node 905 may indicate the resource patterns using a list (e.g., in the configuration), and the order of the resource patterns in the list may indicate an association between resource patterns and RB sets. For example, a first resource pattern in the list may correspond to a first RB set (e.g., having a highest set of frequencies within the CC or a lowest set of frequencies within the CC), a second resource pattern in the list may correspond to a second RB set (e.g., having a second-highest set of frequencies within the CC or a second-lowest set of frequencies within the CC), and so on. Additionally, or alternatively, the number of items in the list may indicate the number of RB sets. In some aspects, the control node 905 may explicitly indicate the association between resource patterns and RB sets in the configuration, such as by indicating a resource pattern in connection with an RB set identifier of an RB set that corresponds to the resource pattern.

As shown by reference number 935, the IAB node 910 may apply one or more resource patterns, of the multiple resource patterns, based at least in part on the configuration. In some aspects, the IAB node 910 may use the one or more resource patterns to communicate with other devices (e.g., other IAB nodes and/or a UE 120) and/or to schedule communications. For example, if the IAB node 910 has a downlink communication for transmission, then the IAB node 910 may use the multiple resource patterns to identify an RB set associated with one or more available (e.g., hard or soft) downlink symbols and/or available flexible symbols (e.g., according to a resource pattern corresponding to the RB set). The IAB node 910 may schedule the downlink communication and/or may transmit the downlink communication in the RB set and in the one or more available downlink symbols (e.g., hard or soft available downlink symbols). In some aspects, if the configuration does not explicitly indicate a resource pattern for a particular RB set, then the IAB node 910 may apply a default resource pattern for the particular RB set.

As indicated above, FIG. 9 is provided as an example. Other examples are possible and may differ from what was described with regard to FIG. 9.

Figure 10:
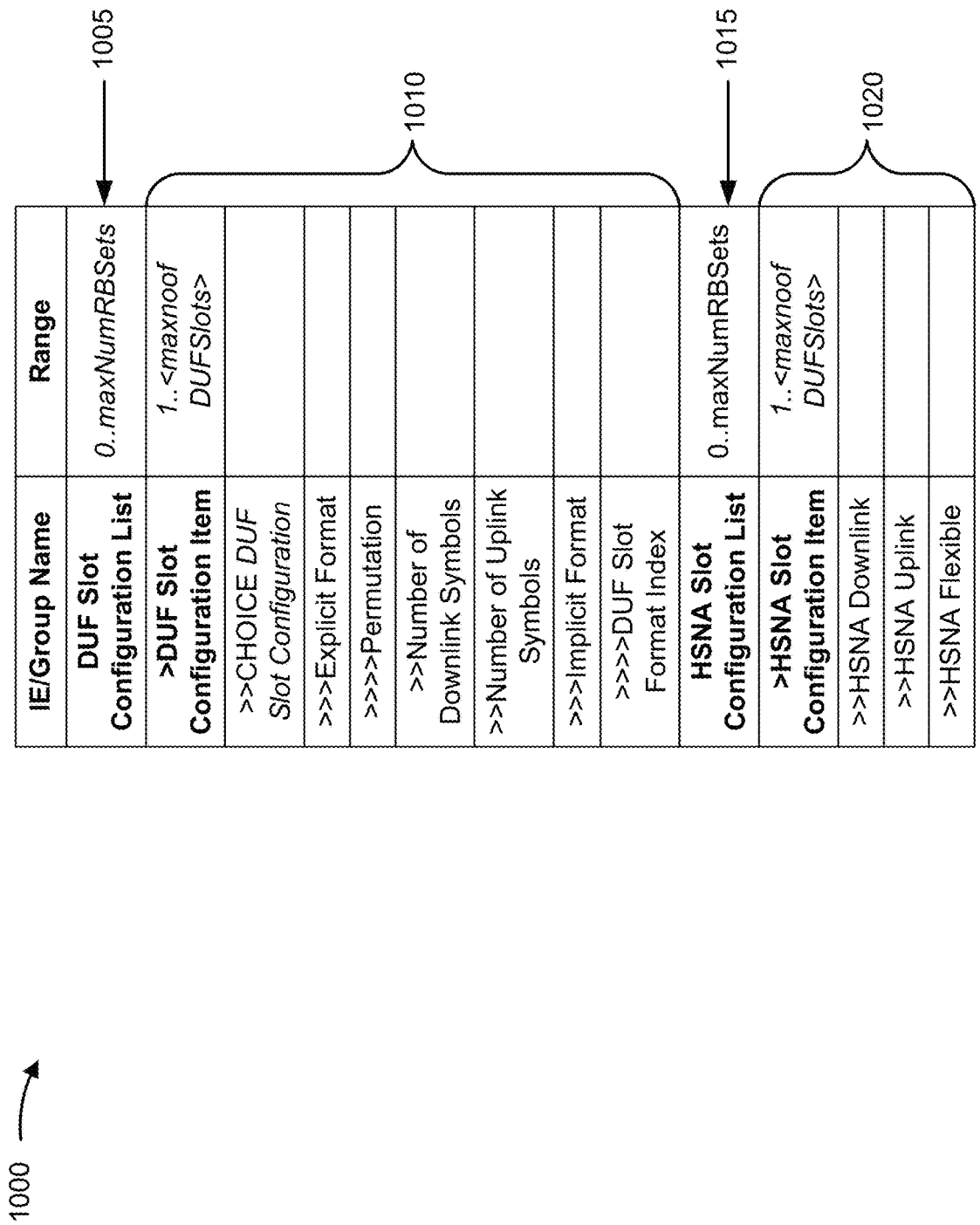

FIG. 10 is a diagram illustrating an example 1000 of indicating a resource pattern for FDM within a CC for a wireless multi-hop network, in accordance with the present disclosure. As described above in connection with FIG. 9, in some aspects, the configuration may indicate a maximum number of RB sets into which a CC can be divided. Thus, the configuration may indicate a maximum number of RB sets, within the CC, to which resource patterns can be applied. FIG. 10 shows an example where resource patterns are indicated using slot configuration items (e.g., DUF slot configuration items for resource directionality patterns, and HSNA slot configuration items for resource availability patterns) in a slot configuration list (e.g., a DUF slot configuration list for the DUF slot configuration items, and an HSNA slot configuration list for the HSNA slot configuration items). For example, the multiple resource patterns may be multiple slot configuration items.

As shown by reference number 1005, the configuration may include a DUF slot configuration list with a range from 0 to the maximum number of RB sets. As shown by reference number 1010, the configuration may include a DUF slot configuration item for each RB set. A DUF slot configuration item may indicate a resource directionality pattern for the RB set (e.g., using one or more of the parameters or information elements (IEs) shown in connection with reference number 1010), as described in more detail above. In some aspects, a first DUF slot configuration item that occurs first in the DUF slot configuration list (e.g., is associated with a value of 0 in the DUF slot configuration list) may be associated with a first RB set (e.g., having a highest set of frequencies within the CC or a lowest set of frequencies within the CC), a second DUF slot configuration item that occurs second in the DUF slot configuration list (e.g., is associated with a value of 1 in the DUF slot configuration list) may be associated with a second RB set (e.g., having a second-highest set of frequencies within the CC or a second-lowest set of frequencies within the CC), and so on.

As shown by reference number 1015, the configuration may include an HSNA slot configuration list with a range from 0 to the maximum number of RB sets. As shown by reference number 1020, the configuration may include an HSNA slot configuration item for each RB set. An HSNA slot configuration item may indicate a resource availability pattern for the RB set (e.g., using one or more of the parameters or information elements (IEs) shown in connection with reference number 1020), as described in more detail above. In some aspects, a first HSNA slot configuration item that occurs first in the HSNA slot configuration list (e.g., is associated with a value of 0 in the HSNA slot configuration list) may be associated with a first RB set (e.g., having a highest set of frequencies within the CC or a lowest set of frequencies within the CC), a second HSNA slot configuration item that occurs second in the HSNA slot configuration list (e.g., is associated with a value of 1 in the DUF slot configuration list) may be associated with a second RB set (e.g., having a second-highest set of frequencies within the CC or a second-lowest set of frequencies within the CC), and so on.

In some aspects, the configuration may indicate the actual number of RB sets using the DUF slot configuration item field and/or the HSNA slot configuration item field. In some aspects, the configuration may include multiple DUF slot configuration lists, with a first DUF slot configuration list applying to 0 or 1 RB sets (e.g., at most one RB set), and a second DUF slot configuration list applying to up to the maximum number of RB sets (as shown in FIG. 10). In this example, the presence of the second DUF slot configuration list and/or values in the second DUF slot configuration list may override the first DUF slot configuration list. Similarly, in some aspects, the configuration may include multiple HSNA slot configuration lists, with a first HSNA slot configuration list applying to 0 or 1 RB sets (e.g., at most one RB set), and a second HSNA slot configuration list applying to up to the maximum number of RB sets (as shown in FIG. 10). In this example, the presence of the second HSNA slot configuration list and/or values in the second HSNA slot configuration list may override the first HSNA slot configuration list.

As indicated above, FIG. 10 is provided as an example. Other examples are possible and may differ from what was described with regard to FIG. 10.

Figure 11:
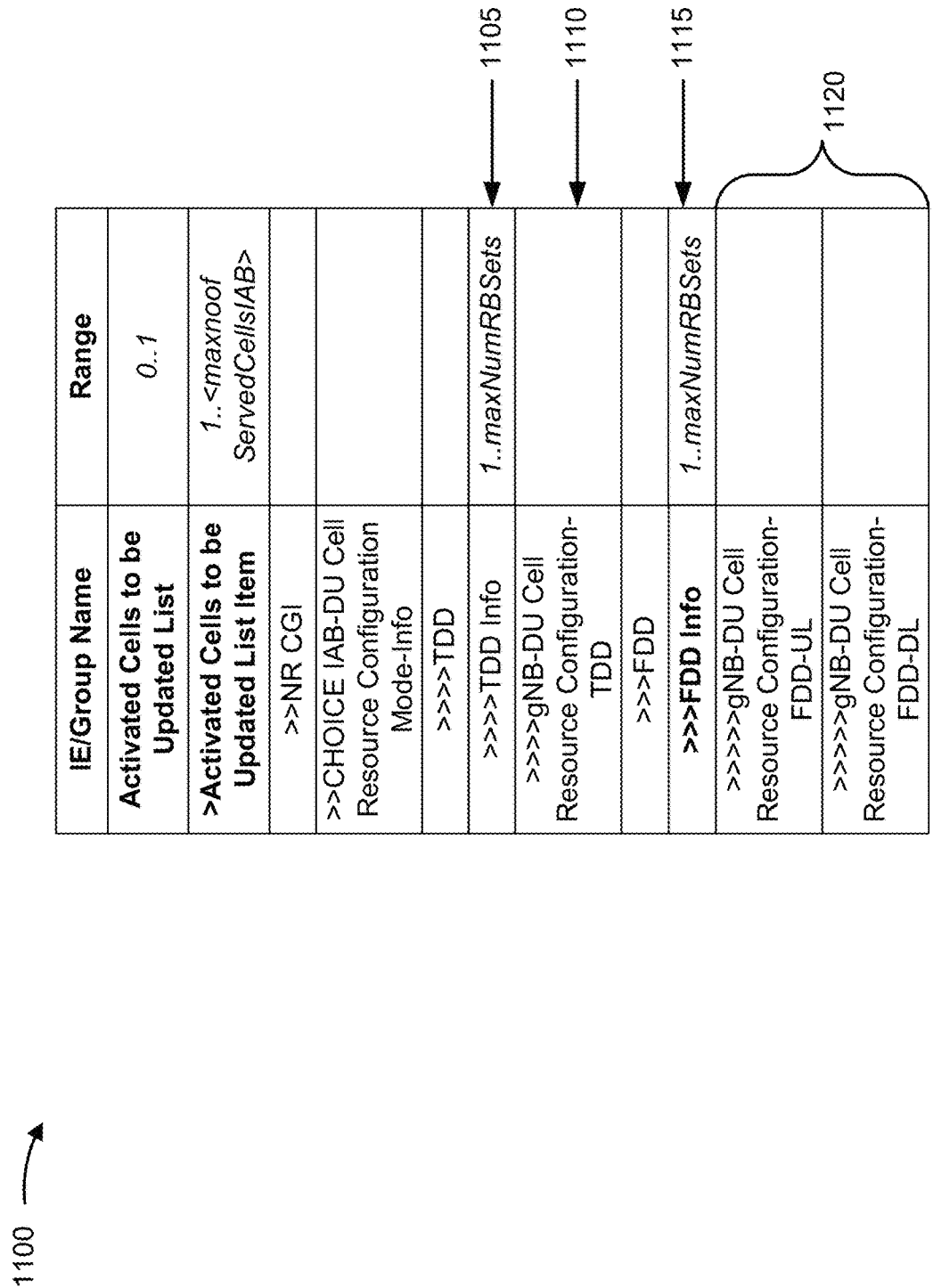

FIG. 11 is a diagram illustrating an example 1100 of indicating a resource pattern for FDM within a CC for a wireless multi-hop network, in accordance with the present disclosure. As described above in connection with FIG. 9, in some aspects, the configuration may indicate a maximum number of RB sets into which a CC can be divided. Thus, the configuration may indicate a maximum number of RB sets, within the CC, to which resource patterns can be applied. FIG. 11 shows an example where resource patterns are indicated using separate cell resource configurations in a configuration message (e.g., an F1-AP message). In this example, all fields in a cell resource configuration (e.g., for a distributed unit of an IAB node, such as a gNB-DU cell resource configuration) can be configured independently and separately for different RB sets.

As shown by reference number 1105, the configuration may include a TDD information element (e.g., within a cell resource configuration) with a range from 1 to the maximum number of RB sets. As shown by reference number 1110, the configuration may include a TDD resource configuration (e.g., gNB-DU cell resource configuration-TDD) for each RB set. The TDD resource configuration may indicate a resource directionality pattern for the RB set, as described in more detail above. In some aspects, a first TDD resource configuration that occurs first in the configuration message (e.g., is associated with a value of 1 of the TDD IE) may be associated with a first RB set (e.g., having a highest set of frequencies within the CC or a lowest set of frequencies within the CC), a second TDD resource configuration that occurs second in the configuration message (e.g., is associated with a value of 2 of the TDD IE) may be associated with a second RB set (e.g., having a second-highest set of frequencies within the CC or a second-lowest set of frequencies within the CC), and so on.

As shown by reference number 1115, the configuration may include an FDD information element (e.g., within a cell resource configuration) with a range from 1 to the maximum number of RB sets. As shown by reference number 1120, the configuration may include an FDD resource configuration (e.g., a gNB-DU cell resource configuration-FDD-UL for an uplink FDD resource configuration, and a gNB-DU cell resource configuration-FDD-DL for a downlink FDD resource configuration) for each RB set. The FDD resource configuration may indicate a resource availability pattern for the RB set, as described in more detail above. In some aspects, a first FDD resource configuration that occurs first in the configuration message (e.g., is associated with a value of 1 of the FDD IE) may be associated with a first RB set (e.g., having a highest set of frequencies within the CC or a lowest set of frequencies within the CC), a second FDD resource configuration that occurs second in the configuration message (e.g., is associated with a value of 2 of the FDD IE) may be associated with a second RB set (e.g., having a second-highest set of frequencies within the CC or a second-lowest set of frequencies within the CC), and so on. In some aspects, the configuration may indicate the actual number of RB sets using the TDD info field and/or the FDD info field.

As indicated above, FIG. 11 is provided as an example. Other examples are possible and may differ from what was described with regard to FIG. 11.

Figure 12:
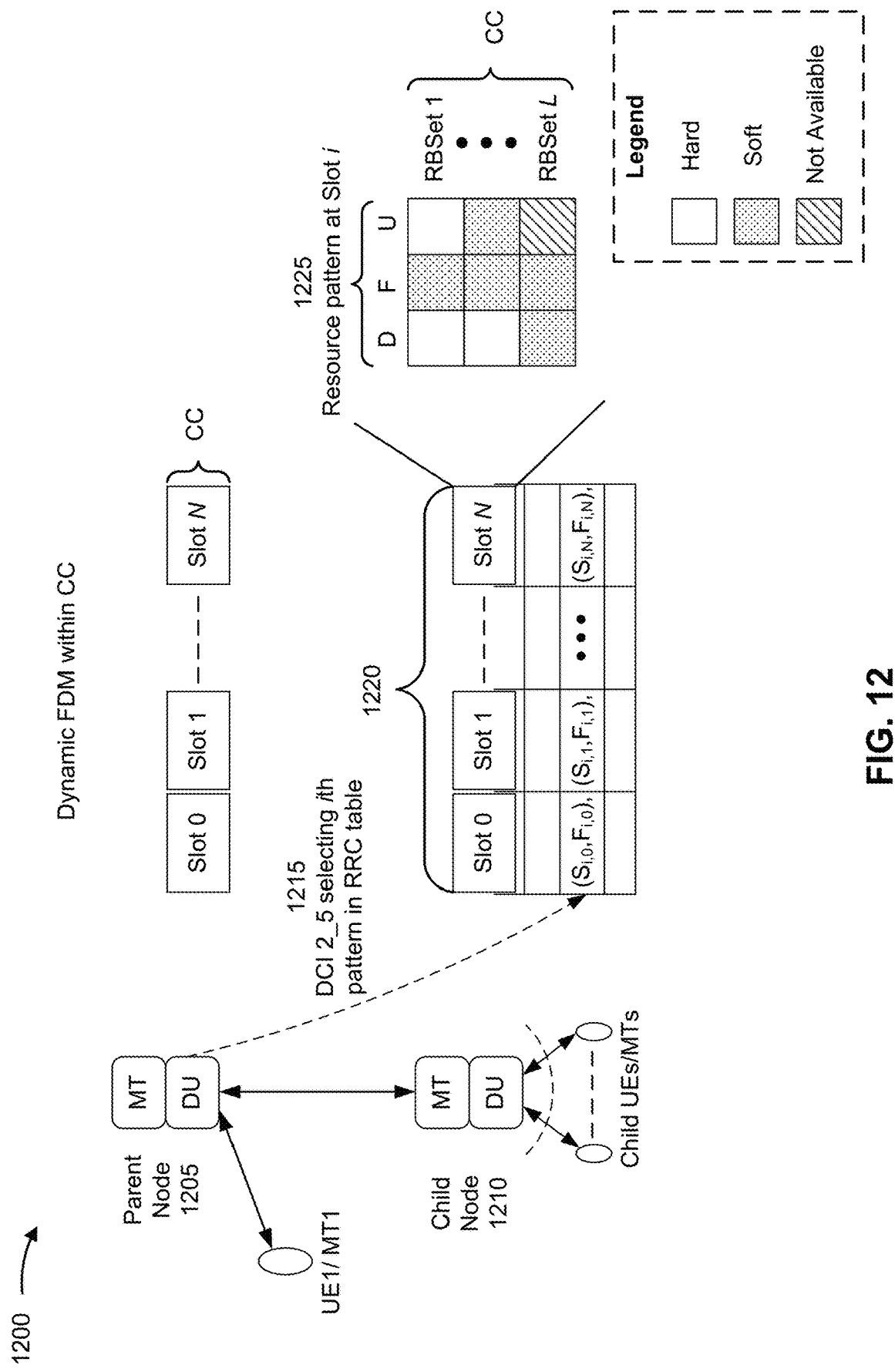

FIG. 12 is a diagram illustrating an example 1200 of indicating a resource pattern for FDM within a CC for a wireless multi-hop network, in accordance with the present disclosure. As shown in FIG. 12, a parent node 1205 (e.g., an IAB donor, a control node, or a first IAB node) and a child node 1210 (e.g., a second IAB node) may communicate with one another.

As shown by reference number 1215, the parent node 1205 may transmit DCI, shown as DCI having DCI format 2_5, to the child node 1210 to indicate availability of soft resources in a slot, as described above in connection with FIG. 7. For example, the child node 1210 may receive a table in a configuration message (e.g., an RRC message) that includes multiple rows, and each row may correspond to an index value. The DCI may indicate an index value to be used by the child node 1210, and the child node 1210 may identify a set of resource patterns (e.g., a row in the table) based at least in part on the indicated index value i. As shown be reference number 1220, the set of resource patterns ($S_{i,0}$, $F_{i,0}$, through $S_{i,N}$, $F_{i,N}$) may correspond to a set of slots (e.g., 0 through N). For example, $S_{i,0}$ may indicate a resource pattern for row index i and Slot 0. Similarly, $F_{i,0}$ may indicate a set of RBs, for row index i and Slot 0, to which the resource pattern is to be applied. As shown by reference number 1225, these parameters can be used to indicate a DUF resource pattern and an HSNA resource pattern per slot.

As indicated above, FIG. 12 is provided as an example. Other examples are possible and may differ from what was described with regard to FIG. 12.

Figure 13:
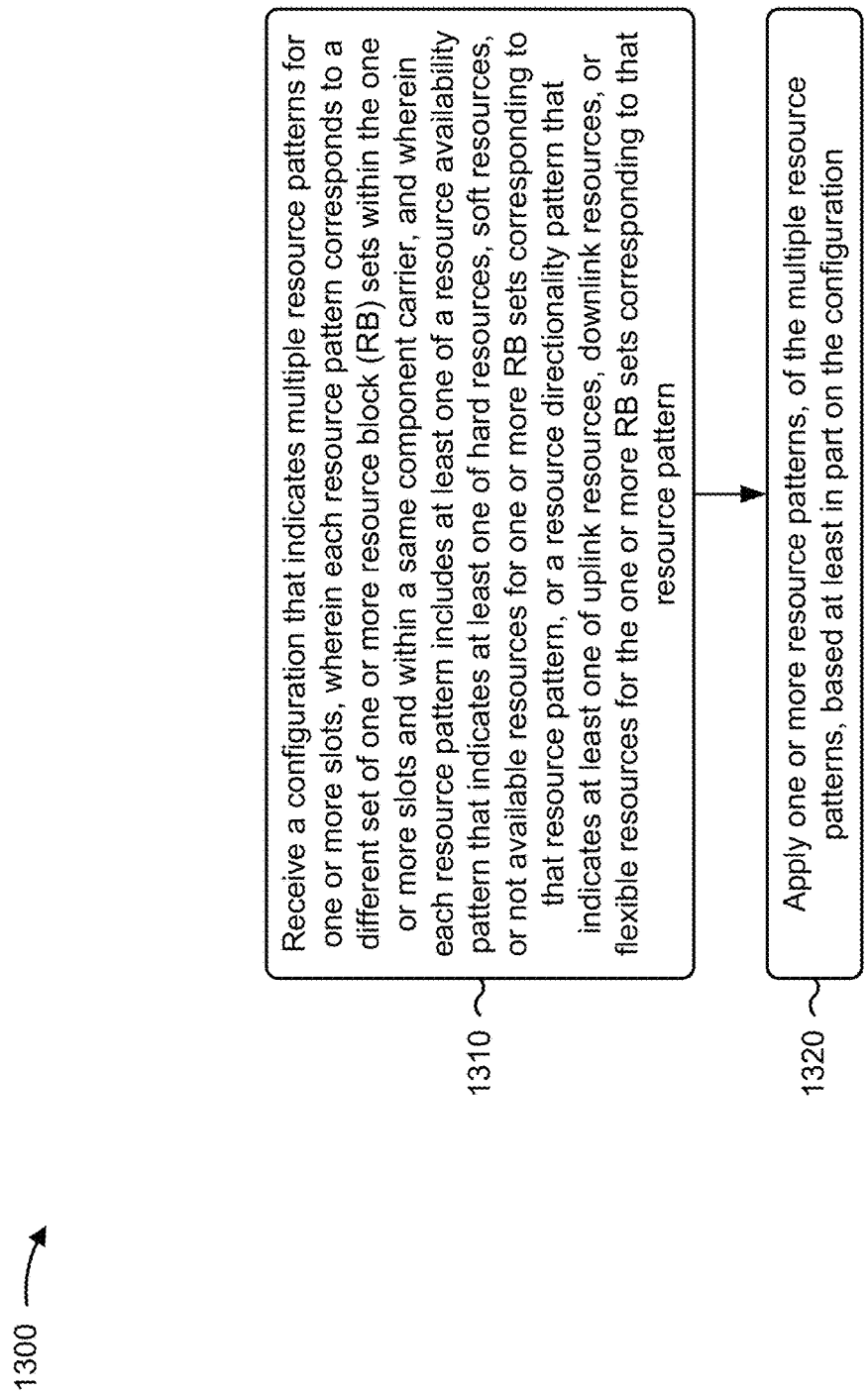
FIGS. 13 and 14 are diagrams illustrating example processes associated with a resource pattern indication for FDM within a CC for a wireless multi-hop network, in accordance with the present disclosure.

FIG. 13 is a diagram illustrating an example process 1300 performed, for example, by a child network node, in accordance with the present disclosure. Example process 1300 is an example where the child network node (e.g., a base station 110 having DU and MT components, a UE 120, an IAB node 410, a child node 610, a child node 710, an IAB node 910, a child node 1210, or the like) performs operations associated with a resource pattern for FDM within a CC for a wireless multi-hop network.

As shown in FIG. 13, in some aspects, process 1300 may include receiving a configuration that indicates multiple resource patterns for one or more slots, wherein each resource pattern corresponds to a different set of one or more RB sets within the one or more slots and within a same component carrier, and wherein each resource pattern includes at least one of: a resource availability pattern that indicates at least one of hard resources, soft resources, or not available resources for one or more RB sets corresponding to that resource pattern, or a resource directionality pattern that indicates at least one of uplink resources, downlink resources, or flexible resources for the one or more RB sets corresponding to that resource pattern (block 1310). For example, the child network node (e.g., using reception component 1502, depicted in FIG. 15) may receive a configuration that indicates multiple resource patterns for one or more slots. In some aspects, each resource pattern corresponds to a different set of one or more RB sets within the one or more slots and within a same component carrier. In some aspects, each resource pattern includes at least one of:

a resource availability pattern that indicates at least one of hard resources, soft resources, or not available resources for one or more RB sets corresponding to that resource pattern; or a resource directionality pattern that indicates at least one of uplink resources, downlink resources, or flexible resources for the one or more RB sets corresponding to that resource pattern, as described above.

As further shown in FIG. 13, in some aspects, process 1300 may include applying one or more resource patterns, of the multiple resource patterns, based at least in part on the configuration (block 1320). For example, the child network node (e.g., using resource pattern application component 1508, depicted in FIG. 15) may apply one or more resource patterns, of the multiple resource patterns, based at least in part on the configuration, as described above.

Process 1300 may include additional aspects, such as any single aspect or any combination of aspects described below and/or in connection with one or more other processes described elsewhere herein.

In a first aspect, a first resource pattern, of the multiple resource patterns, includes a first resource availability pattern that indicates at least one of hard resources, soft resources, or not available resources for one or more first RB sets corresponding to the first resource pattern, and a second resource pattern, of the multiple resource patterns, includes a second resource availability pattern that indicates at least one of hard resources, soft resources, or not available resources for one or more second RB sets corresponding to the second resource pattern.

In a second aspect, alone or in combination with the first aspect, a first resource pattern, of the multiple resource patterns, includes a first resource directionality pattern that indicates at least one of uplink resources, downlink resources, or flexible resources for one or more first RB sets corresponding to the first resource pattern, and a second resource pattern, of the multiple resource patterns, includes a second resource directionality pattern that indicates at least one of uplink resources, downlink resources, or flexible resources for one or more second RB sets corresponding to the second resource pattern.

In a third aspect, alone or in combination with one or more of the first and second aspects, the configuration indicates a maximum number of RB sets, within a component carrier, to which the multiple resource patterns can be applied.

In a fourth aspect, alone or in combination with one or more of the first through third aspects, the multiple resource patterns are multiple slot configuration items indicated in a slot configuration list.

In a fifth aspect, alone or in combination with one or more of the first through fourth aspects, each of the multiple resource patterns is indicated in a separate cell resource configuration of a configuration message.

In a sixth aspect, alone or in combination with one or more of the first through fifth aspects, the multiple resource patterns include different resource patterns per child node or per backhaul link.

In a seventh aspect, alone or in combination with one or more of the first through sixth aspects, each RB set, of the one or more RB sets within the one or more slots and within the same component carrier, includes a group of contiguous RBs.

In an eighth aspect, alone or in combination with one or more of the first through seventh aspects, each RB set, of the one or more RB sets within the one or more slots and within the same component carrier, is a same size except for at most one RB set of the one or more RB sets.

In a ninth aspect, alone or in combination with one or more of the first through eighth aspects, a respective size of each RB set, of the one or more RB sets within the one or more slots and within the same component carrier, is configured by a control node.

In a tenth aspect, alone or in combination with one or more of the first through ninth aspects, an association between a resource pattern, of the multiple resource patterns, and a corresponding RB set is indicated based at least in part on an order in which the resource pattern occurs in a list included in the configuration.

In an eleventh aspect, alone or in combination with one or more of the first through tenth aspects, an association between a resource pattern, of the multiple resource patterns, and a corresponding one or more RB sets is indicated in the configuration.

In a twelfth aspect, alone or in combination with one or more of the first through eleventh aspects, the configuration further indicates a number of slots to which a resource pattern, of the multiple resource patterns, applies.

In a thirteenth aspect, alone or in combination with one or more of the first through twelfth aspects, the one or more resource patterns include a default resource pattern that is applied to an RB set based at least in part on a determination that the configuration does not explicitly indicate an association between the RB set and a resource pattern.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
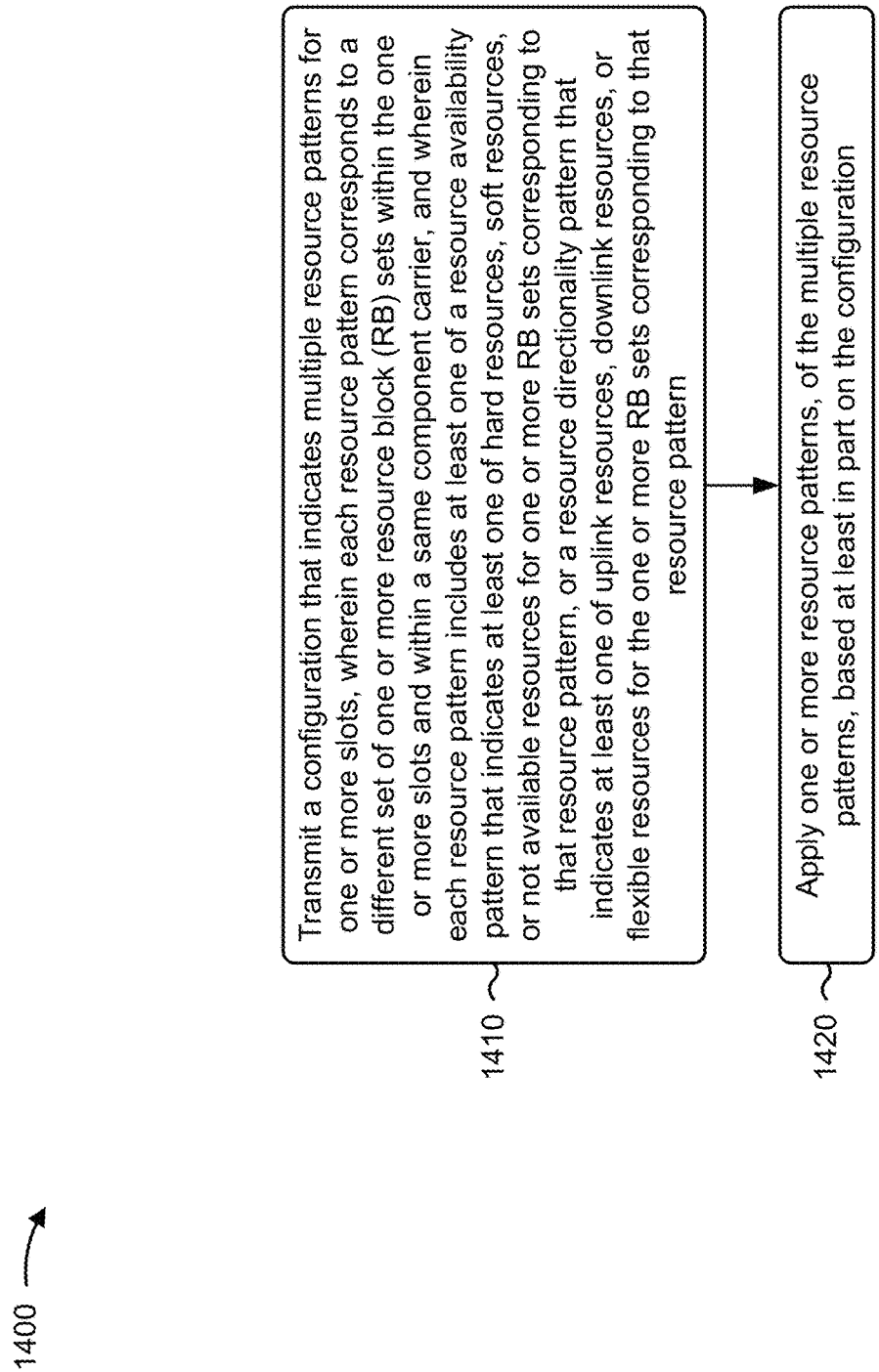

FIG. 14 is a diagram illustrating an example process 1400 performed, for example, by a parent network node, in accordance with the present disclosure. Example process 1400 is an example where the parent network node (e.g., a base station 110 having DU and MT components, an IAB donor 405, an IAB node 410, a parent node 605, a parent node 705, a control node 905, a parent node 1205, a control node, or the like) performs operations associated with indicating a resource pattern for FDM within a CC for a wireless multi-hop network.

As shown in FIG. 14, in some aspects, process 1400 may include transmitting a configuration that indicates multiple resource patterns for one or more slots, wherein each resource pattern corresponds to a different set of one or more RB sets within the one or more slots and within a same component carrier, and wherein each resource pattern includes at least one of: a resource availability pattern that indicates at least one of hard resources, soft resources, or not available resources for one or more RB sets corresponding to that resource pattern, or a resource directionality pattern that indicates at least one of uplink resources, downlink resources, or flexible resources for the one or more RB sets corresponding to that resource pattern (block 1410). For example, the parent network node (e.g., using transmission component 1604, depicted in FIG. 16) may transmit a configuration that indicates multiple resource patterns for one or more slots. In some aspects, each resource pattern corresponds to a different set of one or more RB sets within the one or more slots and within a same component carrier. In some aspects, each resource pattern includes at least one of: a resource availability pattern that indicates at least one of hard resources, soft resources, or not available resources for one or more RB sets corresponding to that resource pattern; or a resource directionality pattern that indicates at least one of uplink resources, downlink resources, or flexible resources for the one or more RB sets corresponding to that resource pattern, as described above.

As further shown in FIG. 14, in some aspects, process 1400 may include applying one or more resource patterns, of the multiple resource patterns, based at least in part on the configuration (block 1420). For example, the parent network node (e.g., using resource pattern application component 1608, depicted in FIG. 16) may apply one or more resource patterns, of the multiple resource patterns, based at least in part on the configuration, as described above.

Process 1400 may include additional aspects, such as any single aspect or any combination of aspects described below and/or in connection with one or more other processes described elsewhere herein.

In a first aspect, a first resource pattern, of the multiple resource patterns, includes a first resource availability pattern that indicates at least one of hard resources, soft resources, or not available resources for one or more first RB sets corresponding to the first resource pattern, and a second resource pattern, of the multiple resource patterns, includes a second resource availability pattern that indicates at least one of hard resources, soft resources, or not available resources for one or more second RB sets corresponding to the second resource pattern.

In a second aspect, alone or in combination with the first aspect, a first resource pattern, of the multiple resource patterns, includes a first resource directionality pattern that indicates at least one of uplink resources, downlink resources, or flexible resources for one or more first RB sets corresponding to the first resource pattern, and a second resource pattern, of the multiple resource patterns, includes a second resource directionality pattern that indicates at least one of uplink resources, downlink resources, or flexible resources for one or more second RB sets corresponding to the second resource pattern.

In a third aspect, alone or in combination with one or more of the first and second aspects, the configuration indicates a maximum number of RB sets, within a component carrier, to which the multiple resource patterns can be applied.

In a fourth aspect, alone or in combination with one or more of the first through third aspects, the multiple resource patterns are multiple slot configuration items indicated in a slot configuration list.

In a fifth aspect, alone or in combination with one or more of the first through fourth aspects, each of the multiple resource patterns is indicated in a separate cell resource configuration of a configuration message.

In a sixth aspect, alone or in combination with one or more of the first through fifth aspects, the multiple resource patterns include different resource patterns per child node or per backhaul link.

In a seventh aspect, alone or in combination with one or more of the first through sixth aspects, each RB set, of the one or more RB sets within the one or more slots and within the same component carrier, includes a group of contiguous RBs.

In an eighth aspect, alone or in combination with one or more of the first through seventh aspects, each RB set, of the one or more RB sets within the one or more slots and within the same component carrier, is a same size except for at most one RB set of the one or more RB sets.

In a ninth aspect, alone or in combination with one or more of the first through eighth aspects, a respective size of each RB set, of the one or more RB sets within the one or more slots and within the same component carrier, is configured by a control node.

In a tenth aspect, alone or in combination with one or more of the first through ninth aspects, an association between a resource pattern, of the multiple resource patterns, and a corresponding RB set is indicated based at least in part on an order in which the resource pattern occurs in a list included in the configuration.

In an eleventh aspect, alone or in combination with one or more of the first through tenth aspects, an association between a resource pattern, of the multiple resource patterns, and a corresponding one or more RB sets is indicated in the configuration.

In a twelfth aspect, alone or in combination with one or more of the first through eleventh aspects, the configuration further indicates a number of slots to which a resource pattern, of the multiple resource patterns, applies.

In a thirteenth aspect, alone or in combination with one or more of the first through twelfth aspects, the one or more resource patterns include a default resource pattern that is applied to an RB set based at least in part on a determination that the configuration does not explicitly indicate an association between the RB set and a resource pattern.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
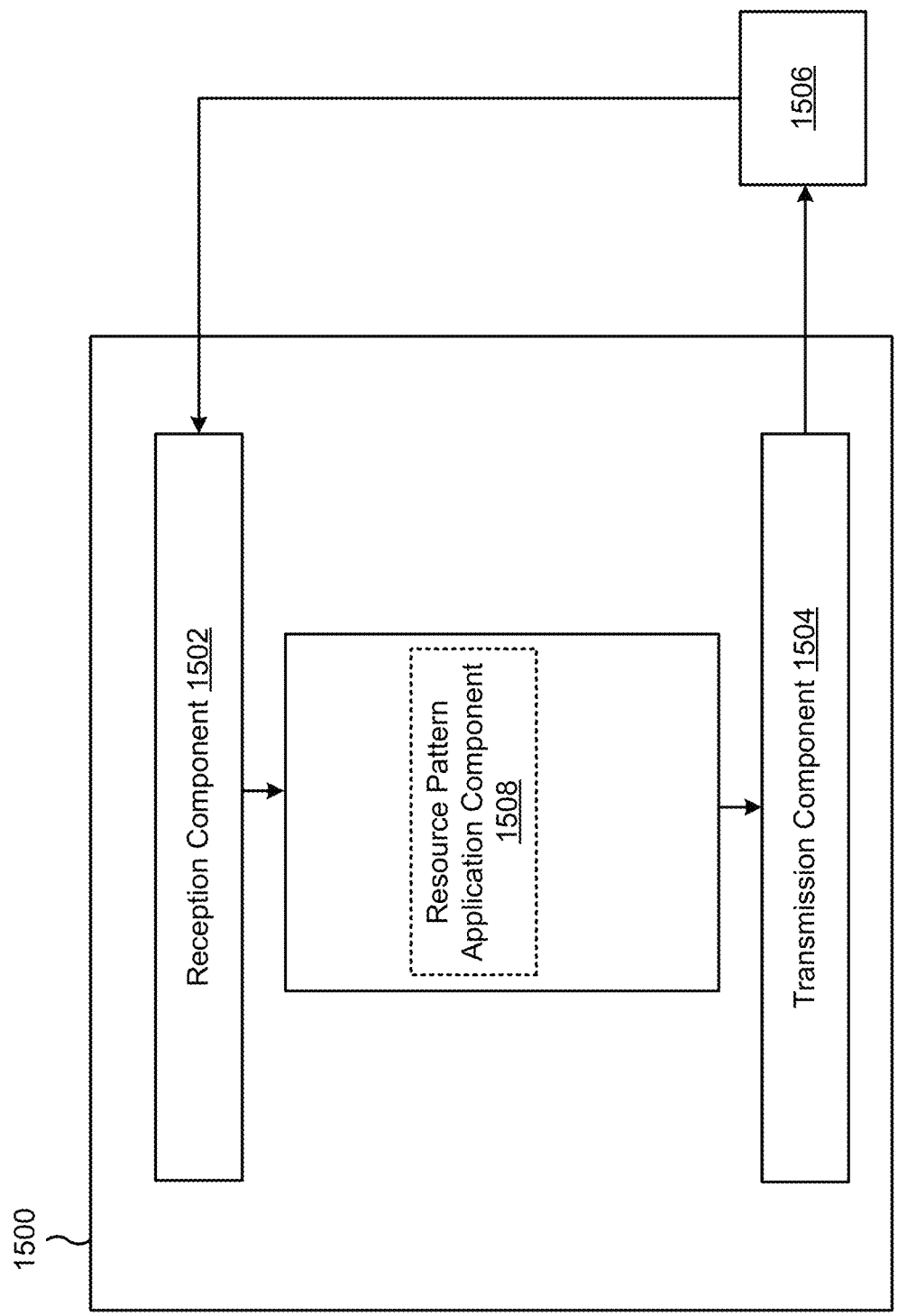
FIGS. 15 and 16 are block diagrams of example apparatuses for wireless communication, in accordance with the present disclosure.

FIG. 15 is a block diagram of an example apparatus 1500 for wireless communication. The apparatus 1500 may be a child network node (e.g., IAB node), or a child network node may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, an IAB node, an IAB donor, a parent network node of the child network node, another child network node of the child network node, or another wireless communication device) using the reception component 1502 and the transmission component 1504. As further shown, the apparatus 1500 may include a resource pattern application component 1508, among other examples.

In some aspects, the apparatus 1500 may be configured to perform one or more operations described herein in connection with FIGS. 8-12. Additionally, or alternatively, the apparatus 1500 may be configured to perform one or more processes described herein, such as process 1300 of FIG. 13. In some aspects, the apparatus 1500 and/or one or more components shown in FIG. 15 may include one or more components of the child network node described above in connection with FIG. 2. Additionally, or alternatively, one or more components shown in FIG. 15 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a demodulator, a MIMO detector, a receive processor, a controller/processor, a memory, or a combination thereof, of the child network node described above in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the child network node described above in connection with FIG. 2. In some aspects, the transmission component 1504 may be co-located with the reception component 1502 in a transceiver.

The reception component 1502 may receive a configuration that indicates multiple resource patterns for one or more slots, wherein each resource pattern corresponds to a different set of one or more RB sets within the one or more slots and within a same component carrier, and wherein each resource pattern includes at least one of a resource availability pattern that indicates at least one of hard resources, soft resources, or not available resources for one or more RB sets corresponding to that resource pattern, or a resource directionality pattern that indicates at least one of uplink resources, downlink resources, or flexible resources for the one or more RB sets corresponding to that resource pattern. The resource pattern application component 1508 may apply one or more resource patterns, of the multiple resource patterns, based at least in part on the configuration.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
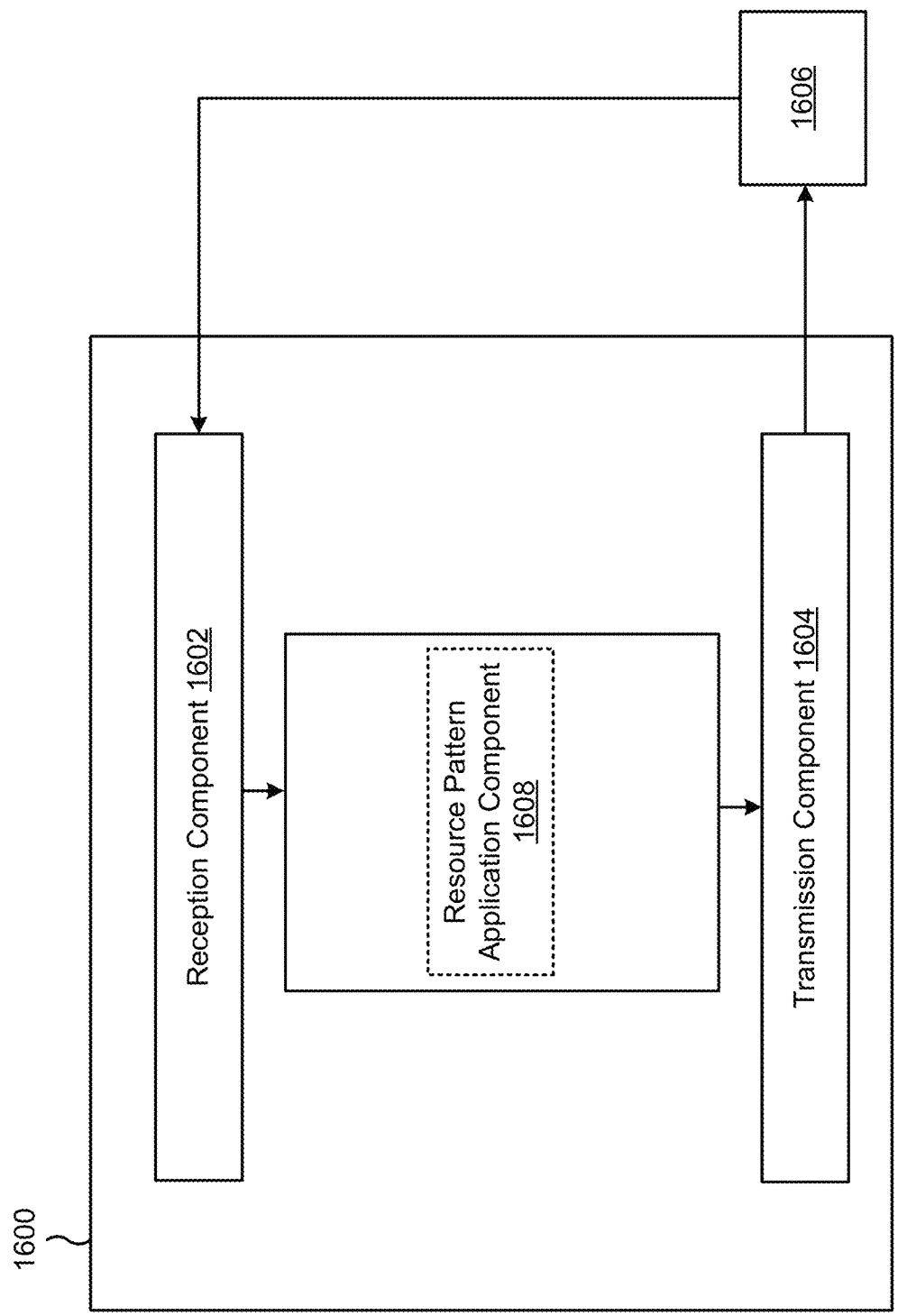

FIG. 16 is a block diagram of an example apparatus 1600 for wireless communication. The apparatus 1600 may be a parent network node (e.g., control node), or a parent network node may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, an IAB node, an IAB donor, another parent network node of the parent network node, a child network node of the parent network node, a control node, or another wireless communication device) using the reception component 1602 and the transmission component 1604. As further shown, the apparatus 1600 may include a resource pattern application component 1608, among other examples.

In some aspects, the apparatus 1600 may be configured to perform one or more operations described herein in connection with FIGS. 8-12. Additionally, or alternatively, the apparatus 1600 may be configured to perform one or more processes described herein, such as process 1400 of FIG. 14. In some aspects, the apparatus 1600 and/or one or more components shown in FIG. 16 may include one or more components of the parent network node described above in connection with FIG. 2. Additionally, or alternatively, one or more components shown in FIG. 16 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1606. In some aspects, the reception component 1602 may include one or more antennas, a demodulator, a MIMO detector, a receive processor, a controller/processor, a memory, or a combination thereof, of the parent network node described above in connection with FIG. 2.

The transmission component 1604 may transmit communications, such as reference signals, control information, data communications, or a combination thereof, to the apparatus 1606. In some aspects, one or more other components of the apparatus 1606 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modulator, a transmit MIMO processor, a transmit processor, a controller/processor, a memory, or a combination thereof, of the parent network node described above in connection with FIG. 2. In some aspects, the transmission component 1604 may be co-located with the reception component 1602 in a transceiver.

The transmission component 1604 may transmit a configuration that indicates multiple resource patterns for one or more slots, wherein each resource pattern corresponds to a different set of one or more RB sets within the one or more slots and within a same component carrier, and wherein each resource pattern includes at least one of a resource availability pattern that indicates at least one of hard resources, soft resources, or not available resources for one or more RB sets corresponding to that resource pattern, or a resource directionality pattern that indicates at least one of uplink resources, downlink resources, or flexible resources for the one or more RB sets corresponding to that resource pattern. The resource pattern application component 1608 may apply one or more resource patterns, of the multiple resource patterns, based at least in part on the configuration.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

Figure 17:
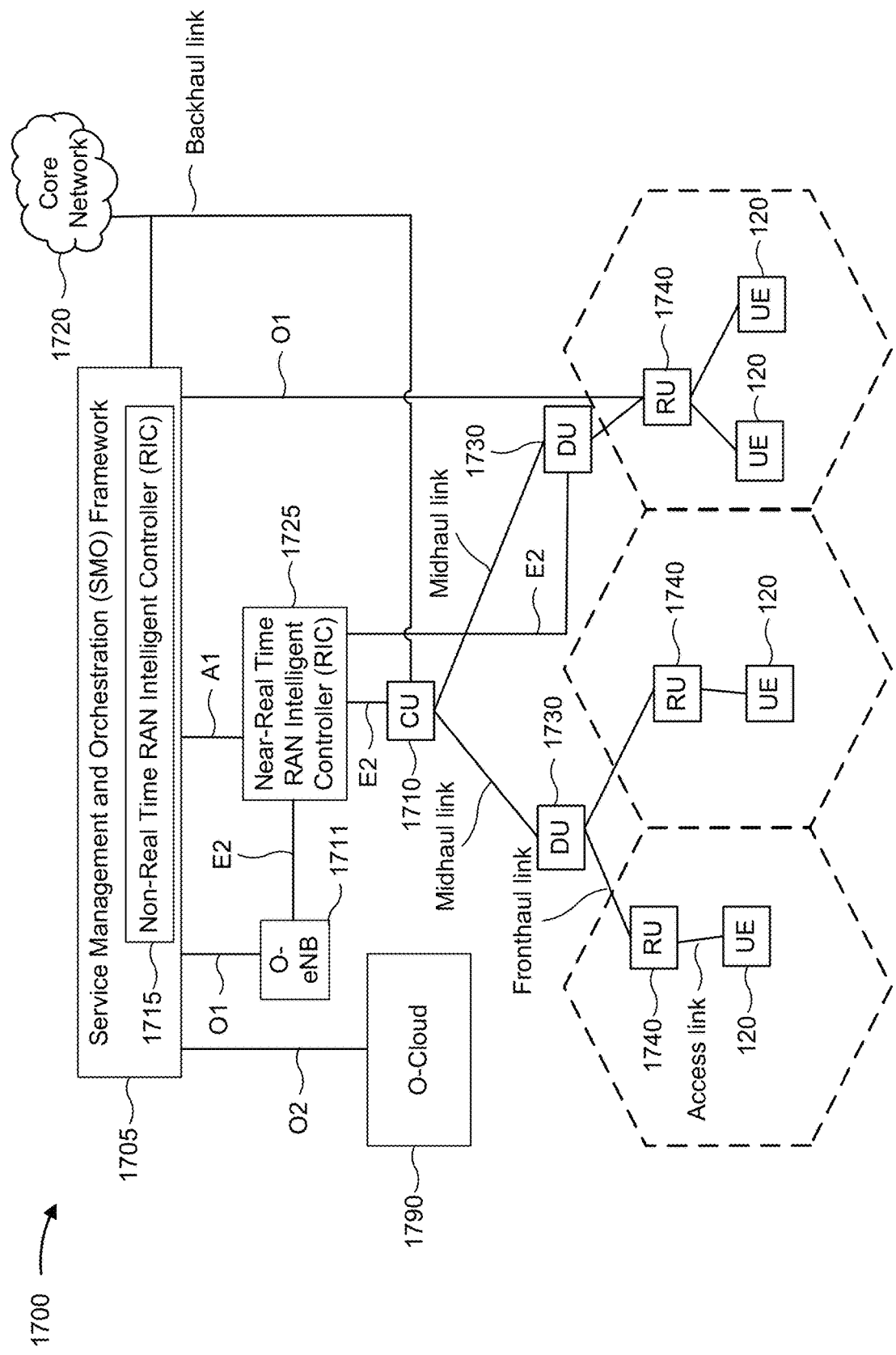
FIG. 17 is a diagram illustrating an example disaggregated base station architecture, in accordance with the present disclosure.

FIG. 17 is a diagram illustrating an example 1700 disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs. In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an IAB network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 17 may include one or more CUs 1710 that can communicate directly with a core network 1720 via a backhaul link, or indirectly with the core network 1720 through one or more disaggregated base station units (such as a Near-Real Time (Near-RT) RAN Intelligent Controller (MC) 1725 via an E2 link, or a Non-Real Time (Non-RT) MC 1715 associated with a Service Management and Orchestration (SMO) Framework 1705, or both). A CU 1710 may communicate with one or more DUs 1730 via respective midhaul links, such as an F1 interface. The DUs 1730 may communicate with one or more RUs 1740 via respective fronthaul links. The RUs 1740 may communicate with respective UEs 120 via one or more radio frequency (RF) access links. In some implementations, the UE 120 may be simultaneously served by multiple RUs 1740.

Each of the units (e.g., the CUs 1710, the DUs 1730, the RUs 1740), as well as the Near-RT RICs 1725, the Non-RT RICs 1715, and the SMO Framework 1705, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 1710 may host one or more higher layer control functions. Such control functions can include RRC, packet data convergence protocol (PDCP), service data adaptation protocol (SDAP), or the like. Each control function can be implemented with an interface configured to communicate signals with other control functions hosted by the CU 1710. The CU 1710 may be configured to handle user plane functionality (e.g., Central Unit—User Plane (CU-UP)), control plane functionality (e.g., Central Unit—Control Plane (CU-CP)), or a combination thereof. In some implementations, the CU 1710 can be logically split into one or more CU-UP units and one or more CU-CP units. The CU-UP unit can communicate bidirectionally with the CU-CP unit via an interface, such as the E1 interface when implemented in an O-RAN configuration. The CU 1710 can be implemented to communicate with the DU 1730, as necessary, for network control and signaling.

The DU 1730 may correspond to a logical unit that includes one or more base station functions to control the operation of one or more RUs 1740. In some aspects, the DU 1730 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 1730 may further host one or more low-PHY layers. Each layer (or module) can be implemented with an interface configured to communicate signals with other layers (and modules) hosted by the DU 1730, or with the control functions hosted by the CU 1710.

Lower-layer functionality can be implemented by one or more RUs 1740. In some deployments, an RU 1740, controlled by a DU 1730, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 1740 can be implemented to handle over the air (OTA) communication with one or more UEs 120. In some implementations, real-time and non-real-time aspects of control and user plane communication with the RU(s) 1740 can be controlled by the corresponding DU 1730. In some scenarios, this configuration can enable the DU(s) 1730 and the CU 1710 to be implemented in a cloud-based RAN architecture, such as a vRAN architecture.

The SMO Framework 1705 may be configured to support RAN deployment and provisioning of non-virtualized and virtualized network elements. For non-virtualized network elements, the SMO Framework 1705 may be configured to support the deployment of dedicated physical resources for RAN coverage requirements which may be managed via an operations and maintenance interface (such as an O1 interface). For virtualized network elements, the SMO Framework 1705 may be configured to interact with a cloud computing platform (such as an open cloud (O-Cloud) 1790) to perform network element life cycle management (such as to instantiate virtualized network elements) via a cloud computing platform interface (such as an O2 interface). Such virtualized network elements can include, but are not limited to, CUs 1710, DUs 1730, RUs 1740 and Near-RT RICs 1725. In some implementations, the SMO Framework 1705 can communicate with a hardware aspect of a 4G RAN, such as an open eNB (O-eNB) 1111, via an O1 interface. Additionally, in some implementations, the SMO Framework 1705 can communicate directly with one or more RUs 1740 via an O1 interface. The SMO Framework 1705 also may include a Non-RT RIC 1715 configured to support functionality of the SMO Framework 1705.

The Non-RT RIC 1715 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1725. The Non-RT RIC 1715 may be coupled to or communicate with (such as via an A1 interface) the Near-RT RIC 1725. The Near-RT RIC 1725 may be configured to include a logical function that enables near-real-time control and optimization of RAN elements and resources via data collection and actions over an interface (such as via an E2 interface) connecting one or more CUs 1710, one or more DUs 1730, or both, as well as an O-eNB, with the Near-RT RIC 1725.

In some implementations, to generate AI/ML models to be deployed in the Near-RT RIC 1725, the Non-RT RIC 1715 may receive parameters or external enrichment information from external servers. Such information may be utilized by the Near-RT RIC 1725 and may be received at the SMO Framework 1705 or the Non-RT MC 1715 from non-network data sources or from network functions. In some examples, the Non-RT MC 1715 or the Near-RT MC 1725 may be configured to tune RAN behavior or performance. For example, the Non-RT MC 1715 may monitor long-term trends and patterns for performance and employ AI/ML models to perform corrective actions through the SMO Framework 1705 (such as reconfiguration via O1) or via creation of RAN management policies (such as A1 policies).

As indicated above, FIG. 17 is provided as an example. Other examples may differ from what is described with regard to FIG. 17.

The following provides an overview of some Aspects of the present disclosure:

Aspect 1: A method of wireless communication performed by an integrated access and backhaul (IAB) node, comprising: receiving a configuration that indicates multiple resource patterns for one or more slots, wherein each resource pattern corresponds to a different set of one or more resource block (RB) sets within the one or more slots and within a same component carrier, and wherein each resource pattern includes at least one of: a resource availability pattern that indicates at least one of hard resources, soft resources, or not available resources for one or more RB sets corresponding to that resource pattern, or a resource directionality pattern that indicates at least one of uplink resources, downlink resources, or flexible resources for the one or more RB sets corresponding to that resource pattern; and applying one or more resource patterns, of the multiple resource patterns, based at least in part on the configuration.

Aspect 2: The method of Aspect 1, wherein a first resource pattern, of the multiple resource patterns, includes a first resource availability pattern that indicates at least one of hard resources, soft resources, or not available resources for one or more first RB sets corresponding to the first resource pattern; and wherein a second resource pattern, of the multiple resource patterns, includes a second resource availability pattern that indicates at least one of hard resources, soft resources, or not available resources for one or more second RB sets corresponding to the second resource pattern.

Aspect 3: The method of any of Aspects 1-2, wherein a first resource pattern, of the multiple resource patterns, includes a first resource directionality pattern that indicates at least one of uplink resources, downlink resources, or flexible resources for one or more first RB sets corresponding to the first resource pattern; and wherein a second resource pattern, of the multiple resource patterns, includes a second resource directionality pattern that indicates at least one of uplink resources, downlink resources, or flexible resources for one or more second RB sets corresponding to the second resource pattern.

Aspect 4: The method of any of Aspects 1-3, wherein the configuration indicates a maximum number of RB sets, within a component carrier, to which the multiple resource patterns can be applied.

Aspect 5: The method of any of Aspects 1-4, wherein the multiple resource patterns are multiple slot configuration items indicated in a slot configuration list.

Aspect 6: The method of any of Aspects 1-4, wherein each of the multiple resource patterns is indicated in a separate cell resource configuration of a configuration message.

Aspect 7: The method of any of Aspects 1-6, wherein the multiple resource patterns include different resource patterns per child node or per backhaul link.

Aspect 8: The method of any of Aspects 1-7, wherein each RB set, of the one or more RB sets within the one or more slots and within the same component carrier, includes a group of contiguous RBs.

Aspect 9: The method of any of Aspects 1-8, wherein each RB set, of the one or more RB sets within the one or more slots and within the same component carrier, is a same size except for at most one RB set of the one or more RB sets.

Aspect 10: The method of any of Aspects 1-9, wherein a respective size of each RB set, of the one or more RB sets within the one or more slots and within the same component carrier, is configured by a control node.

Aspect 11: The method of any of Aspects 1-10, wherein an association between a resource pattern, of the multiple resource patterns, and a corresponding RB set is indicated based at least in part on an order in which the resource pattern occurs in a list included in the configuration.

Aspect 12: The method of any of Aspects 1-11, wherein an association between a resource pattern, of the multiple resource patterns, and a corresponding one or more RB sets is indicated in the configuration.

Aspect 13: The method of any of Aspects 1-12, wherein the configuration further indicates a number of slots to which a resource pattern, of the multiple resource patterns, applies.

Aspect 14: The method of any of Aspects 1-13, wherein the one or more resource patterns include a default resource pattern that is applied to an RB set based at least in part on a determination that the configuration does not explicitly indicate an association between the RB set and a resource pattern.

Aspect 15: A method of wireless communication performed by a control node, comprising: transmitting a configuration that indicates multiple resource patterns for one or more slots, wherein each resource pattern corresponds to a different set of one or more resource block (RB) sets within the one or more slots and within a same component carrier, and wherein each resource pattern includes at least one of: a resource availability pattern that indicates at least one of hard resources, soft resources, or not available resources for one or more RB sets corresponding to that resource pattern, or a resource directionality pattern that indicates at least one of uplink resources, downlink resources, or flexible resources for the one or more RB sets corresponding to that resource pattern; and applying one or more resource patterns, of the multiple resource patterns, based at least in part on the configuration.

Aspect 16: The method of Aspect 15, wherein a first resource pattern, of the multiple resource patterns, includes a first resource availability pattern that indicates at least one of hard resources, soft resources, or not available resources for one or more first RB sets corresponding to the first resource pattern; and wherein a second resource pattern, of the multiple resource patterns, includes a second resource availability pattern that indicates at least one of hard resources, soft resources, or not available resources for one or more second RB sets corresponding to the second resource pattern.

Aspect 17: The method of any of Aspects 15-16, wherein a first resource pattern, of the multiple resource patterns, includes a first resource directionality pattern that indicates at least one of uplink resources, downlink resources, or flexible resources for one or more first RB sets corresponding to the first resource pattern; and wherein a second resource pattern, of the multiple resource patterns, includes a second resource directionality pattern that indicates at least one of uplink resources, downlink resources, or flexible resources for one or more second RB sets corresponding to the second resource pattern.

Aspect 18: The method of any of Aspects 15-17, wherein the configuration indicates a maximum number of RB sets, within a component carrier, to which the multiple resource patterns can be applied.

Aspect 19: The method of any of Aspects 15-18, wherein the multiple resource patterns are multiple slot configuration items indicated in a slot configuration list.

Aspect 20: The method of any of Aspects 15-18, wherein each of the multiple resource patterns is indicated in a separate cell resource configuration of a configuration message.

Aspect 21: The method of any of Aspects 15-20, wherein the multiple resource patterns include different resource patterns per child node or per backhaul link.

Aspect 22: The method of any of Aspects 15-21, wherein each RB set, of the one or more RB sets within the one or more slots and within the same component carrier, includes a group of contiguous RBs.

Aspect 23: The method of any of Aspects 15-22, wherein each RB set, of the one or more RB sets within the one or more slots and within the same component carrier, is a same size except for at most one RB set of the one or more RB sets.

Aspect 24: The method of any of Aspects 15-23, wherein a respective size of each RB set, of the one or more RB sets within the one or more slots and within the same component carrier, is configured by a control node.

Aspect 25: The method of any of Aspects 15-24, wherein an association between a resource pattern, of the multiple resource patterns, and a corresponding RB set is indicated based at least in part on an order in which the resource pattern occurs in a list included in the configuration.

Aspect 26: The method of any of Aspects 15-25, wherein an association between a resource pattern, of the multiple resource patterns, and a corresponding one or more RB sets is indicated in the configuration.

Aspect 27: The method of any of Aspects 15-26, wherein the configuration further indicates a number of slots to which a resource pattern, of the multiple resource patterns, applies.

Aspect 28: The method of any of Aspects 15-27, wherein the one or more resource patterns include a default resource pattern that is applied to an RB set based at least in part on a determination that the configuration does not explicitly indicate an association between the RB set and a resource pattern.

Aspect 29: An apparatus for wireless communication at a device, comprising a processor; memory coupled with the processor; and instructions stored in the memory and executable by the processor to cause the apparatus to perform the method of one or more Aspects of Aspects 1-14.

Aspect 30: A device for wireless communication, comprising a memory and one or more processors coupled to the memory, the memory and the one or more processors configured to perform the method of one or more Aspects of Aspects 1-14.

Aspect 31: An apparatus for wireless communication, comprising at least one means for performing the method of one or more Aspects of Aspects 1-14.

Aspect 32: A non-transitory computer-readable medium storing code for wireless communication, the code comprising instructions executable by a processor to perform the method of one or more Aspects of Aspects 1-14.

Aspect 33: A non-transitory computer-readable medium storing a set of instructions for wireless communication, the set of instructions comprising one or more instructions that, when executed by one or more processors of a device, cause the device to perform the method of one or more Aspects of Aspects 1-14.

Aspect 34: An apparatus for wireless communication at a device, comprising a processor; memory coupled with the processor; and instructions stored in the memory and executable by the processor to cause the apparatus to perform the method of one or more Aspects of Aspects 15-28.

Aspect 35: A device for wireless communication, comprising a memory and one or more processors coupled to the memory, the memory and the one or more processors configured to perform the method of one or more Aspects of Aspects 15-28.

Aspect 36: An apparatus for wireless communication, comprising at least one means for performing the method of one or more Aspects of Aspects 15-28.

Aspect 37: A non-transitory computer-readable medium storing code for wireless communication, the code comprising instructions executable by a processor to perform the method of one or more Aspects of Aspects 15-28.

Aspect 38: A non-transitory computer-readable medium storing a set of instructions for wireless communication, the set of instructions comprising one or more instructions that, when executed by one or more processors of a device, cause the device to perform the method of one or more Aspects of Aspects 15-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An integrated access and backhaul (IAB) node for wireless communication, comprising:
   a one or more memories; and
   one or more processors, coupled to the one or more memories, configured to:
      receive a configuration that indicates multiple resource patterns for one or more slots, wherein each resource pattern corresponds to a different set of one or more resource block (RB) sets within the one or more slots and within a same component carrier, wherein the configuration indicates a maximum number of RB sets, within a component carrier, to which the multiple resource patterns can be applied, and wherein each resource pattern includes at least one of:
         a resource availability pattern that indicates at least one of hard resources, soft resources, or not available resources for one or more RB sets corresponding to that resource pattern, or
         a resource directionality pattern that indicates at least one of uplink resources, downlink resources, or flexible resources for the one or more RB sets corresponding to that resource pattern; and apply one or more resource patterns, of the multiple resource patterns, based at least in part on the configuration.

2. The IAB node of claim 1, wherein a first resource pattern, of the multiple resource patterns, includes a first resource availability pattern that indicates at least one of hard resources, soft resources, or not available resources for one or more first RB sets corresponding to the first resource pattern; and
   wherein a second resource pattern, of the multiple resource patterns, includes a second resource availability pattern that indicates at least one of hard resources, soft resources, or not available resources for one or more second RB sets corresponding to the second resource pattern.

3. The IAB node of claim 1, wherein a first resource pattern, of the multiple resource patterns, includes a first resource directionality pattern that indicates at least one of uplink resources, downlink resources, or flexible resources for one or more first RB sets corresponding to the first resource pattern; and
   wherein a second resource pattern, of the multiple resource patterns, includes a second resource directionality pattern that indicates at least one of uplink resources, downlink resources, or flexible resources for one or more second RB sets corresponding to the second resource pattern.

4. The IAB node of claim 1, wherein the multiple resource patterns are multiple slot configuration items indicated in a slot configuration list.

5. The IAB node of claim 1, wherein each of the multiple resource patterns is indicated in a separate cell resource configuration of a configuration message.

6. The IAB node of claim 1, wherein the multiple resource patterns include different resource patterns per child node or per backhaul link.

7. The IAB node of claim 1, wherein each RB set, of the one or more RB sets within the one or more slots and within the same component carrier, includes a group of contiguous RBs.

8. The IAB node of claim 1, wherein each RB set, of the one or more RB sets within the one or more slots and within the same component carrier, is a same size except for at most one RB set of the one or more RB sets.

9. The IAB node of claim 1, wherein a respective size of each RB set, of the one or more RB sets within the one or more slots and within the same component carrier, is configured by a control node.

10. The IAB node of claim 1, wherein an association between a resource pattern, of the multiple resource patterns, and a corresponding RB set is indicated based at least in part on an order in which the resource pattern occurs in a list included in the configuration.

11. The IAB node of claim 1, wherein an association between a resource pattern, of the multiple resource patterns, and a corresponding one or more RB sets is indicated in the configuration.

12. The IAB node of claim 1, wherein the configuration further indicates a number of slots to which a resource pattern, of the multiple resource patterns, applies.

13. The IAB node of claim 1, wherein the one or more resource patterns include a default resource pattern that is applied to an RB set based at least in part on a determination that the configuration does not explicitly indicate an association between the RB set and a resource pattern.

14. A control node for wireless communication, comprising:
   a one or more memories; and
   one or more processors, coupled to the one or more memories, configured to:
      transmit a configuration that indicates multiple resource patterns for one or more slots, wherein each resource pattern corresponds to a different set of one or more resource block (RB) sets within the one or more slots and within a same component carrier, wherein the configuration indicates a maximum number of RB sets, within a component carrier, to which the multiple resource patterns can be applied, and wherein each resource pattern includes at least one of:
         a resource availability pattern that indicates at least one of hard resources, soft resources, or not available resources for one or more RB sets corresponding to that resource pattern, or
         a resource directionality pattern that indicates at least one of uplink resources, downlink resources, or flexible resources for the one or more RB sets corresponding to that resource pattern; and
      apply one or more resource patterns, of the multiple resource patterns, based at least in part on the configuration.

15. The control node of claim 14, wherein a first resource pattern, of the multiple resource patterns, includes a first resource availability pattern that indicates at least one of hard resources, soft resources, or not available resources for one or more first RB sets corresponding to the first resource pattern; and
   wherein a second resource pattern, of the multiple resource patterns, includes a second resource availability pattern that indicates at least one of hard resources, soft resources, or not available resources for one or more second RB sets corresponding to the second resource pattern.

16. The control node of claim 14, wherein a first resource pattern, of the multiple resource patterns, includes a first resource directionality pattern that indicates at least one of uplink resources, downlink resources, or flexible resources for one or more first RB sets corresponding to the first resource pattern; and
   wherein a second resource pattern, of the multiple resource patterns, includes a second resource directionality pattern that indicates at least one of uplink resources, downlink resources, or flexible resources for one or more second RB sets corresponding to the second resource pattern.

17. The control node of claim 14, wherein the multiple resource patterns are multiple slot configuration items indicated in a slot configuration list.

18. The control node of claim 14, wherein each of the multiple resource patterns is indicated in a separate cell resource configuration of a configuration message.

19. The control node of claim 14, wherein the multiple resource patterns include different resource patterns per child node or per backhaul link.

20. The control node of claim 14, wherein each RB set, of the one or more RB sets within the one or more slots and within the same component carrier, includes a group of contiguous RBs.

21. The control node of claim 14, wherein each RB set, of the one or more RB sets within the one or more slots and within the same component carrier, is a same size except for at most one RB set of the one or more RB sets.

22. The control node of claim 14, wherein a respective size of each RB set, of the one or more RB sets within the one or more slots and within the same component carrier, is configured by a control node.

23. The control node of claim 14, wherein an association between a resource pattern, of the multiple resource patterns, and a corresponding RB set is indicated based at least in part on an order in which the resource pattern occurs in a list included in the configuration.

24. The control node of claim 14, wherein an association between a resource pattern, of the multiple resource patterns, and a corresponding one or more RB sets is indicated in the configuration.

25. The control node of claim 14, wherein the configuration further indicates a number of slots to which a resource pattern, of the multiple resource patterns, applies.

26. The control node of claim 14, wherein the one or more resource patterns include a default resource pattern that is applied to an RB set based at least in part on a determination that the configuration does not explicitly indicate an association between the RB set and a resource pattern.

27. A method of wireless communication performed by an integrated access and backhaul (IAB) node, comprising:
   receiving a configuration that indicates multiple resource patterns for one or more slots, wherein each resource pattern corresponds to a different set of one or more resource block (RB) sets within the one or more slots and within a same component carrier, wherein the configuration indicates a maximum number of RB sets, within a component carrier, to which the multiple resource patterns can be applied, and wherein each resource pattern includes at least one of:
      a resource availability pattern that indicates at least one of hard resources, soft resources, or not available resources for one or more RB sets corresponding to that resource pattern, or
      a resource directionality pattern that indicates at least one of uplink resources, downlink resources, or flexible resources for the one or more RB sets corresponding to that resource pattern; and
   applying one or more resource patterns, of the multiple resource patterns, based at least in part on the configuration.

28. A method of wireless communication performed by a control node, comprising:
   transmitting a configuration that indicates multiple resource patterns for one or more slots, wherein each resource pattern corresponds to a different set of one or more resource block (RB) sets within the one or more slots and within a same component carrier, wherein the configuration indicates a maximum number of RB sets, within a component carrier, to which the multiple resource patterns can be applied, and wherein each resource pattern includes at least one of:
      a resource availability pattern that indicates at least one of hard resources, soft resources, or not available resources for one or more RB sets corresponding to that resource pattern, or
      a resource directionality pattern that indicates at least one of uplink resources, downlink resources, or flexible resources for the one or more RB sets corresponding to that resource pattern; and
   applying one or more resource patterns, of the multiple resource patterns, based at least in part on the configuration.

29. The method of claim 27, wherein an association between a resource pattern, of the multiple resource patterns, and a corresponding RB set is indicated based at least in part on an order in which the resource pattern occurs in a list included in the configuration.

30. The method of claim 28, wherein an association between a resource pattern, of the multiple resource patterns, and a corresponding RB set is indicated based at least in part on an order in which the resource pattern occurs in a list included in the configuration.

* * * * *